US009781586B2

(12) United States Patent
Jung et al.

(10) Patent No.: US 9,781,586 B2
(45) Date of Patent: Oct. 3, 2017

(54) METHOD OF TRANSMITTING/RECEIVING SIGNAL IN PROXIMITY NETWORK AND ELECTRONIC DEVICE THEREOF

(71) Applicant: Samsung Electronics Co., Ltd., Gyeonggi-do (KR)

(72) Inventors: Bu-Seop Jung, Gyeonggi-do (KR); Young-Kwan Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/952,352

(22) Filed: Nov. 25, 2015

(65) Prior Publication Data
US 2016/0150392 A1    May 26, 2016

(30) Foreign Application Priority Data
Nov. 25, 2014  (KR) ........................ 10-2014-0165566

(51) Int. Cl.
*H04W 48/10* (2009.01)
*H04L 29/06* (2006.01)
*H04W 8/00* (2009.01)
*H04W 76/04* (2009.01)
*H04L 29/08* (2006.01)

(52) U.S. Cl.
CPC ........... *H04W 8/005* (2013.01); *H04L 67/104* (2013.01); *H04L 67/303* (2013.01); *H04W 76/046* (2013.01)

(58) Field of Classification Search
CPC . H04L 67/104; H04L 67/303; H04L 65/1069; H04W 76/046; H04W 8/005; H04W 52/0229; H04W 48/10

USPC ........................................ 455/450; 370/254
See application file for complete search history.

(56) References Cited

U.S. PATENT DOCUMENTS

| 9,544,754 B1* | 1/2017 | Lambert ................ H04W 8/005 |
| 2014/0082205 A1* | 3/2014 | Abraham ............ H04L 65/1069 709/227 |
| 2014/0112189 A1* | 4/2014 | Abraham .............. H04W 4/206 370/254 |

(Continued)

FOREIGN PATENT DOCUMENTS

| KR | 1020140090546 | 7/2014 |
| WO | WO 2014/089252 | 6/2014 |

(Continued)

OTHER PUBLICATIONS

Wi-Fi Alliance Association, "Neighbor Awareness Networking Technical Specification", Version 1.0, May 1, 2015, 98 pages.

(Continued)

*Primary Examiner* — Nathan Taylor
(74) *Attorney, Agent, or Firm* — The Farrell Law Firm, P.C.

(57) ABSTRACT

Disclosed are an apparatus and a method for efficiently providing a proximity network service and a post operation in an electronic device. An operation method of an electronic device includes configuring a cluster with another electronic device, transmitting information for a post operation within a synchronized communication duration of the cluster, receiving a response signal of the information for the post operation, and communicating with at least one other electronic device for the post operation during a post operation duration based on the response information.

22 Claims, 21 Drawing Sheets

(56) References Cited

U.S. PATENT DOCUMENTS

| | | | |
|---|---|---|---|
| 2014/0196025 A1* | 7/2014 | Corinella | H04W 4/001 |
| | | | 717/178 |
| 2014/0254426 A1* | 9/2014 | Abraham | H04W 48/10 |
| | | | 370/254 |
| 2014/0254513 A1 | 9/2014 | Abraham et al. | |
| 2014/0254555 A1 | 9/2014 | Reznik et al. | |
| 2014/0254569 A1 | 9/2014 | Abraham et al. | |
| 2014/0269514 A1 | 9/2014 | Leppanen et al. | |
| 2014/0269555 A1 | 9/2014 | Sadasivam et al. | |
| 2014/0269658 A1 | 9/2014 | Sadasivam et al. | |
| 2014/0293858 A1 | 10/2014 | Kalhan et al. | |
| 2014/0308958 A1 | 10/2014 | Amirijoo et al. | |
| 2016/0242033 A1* | 8/2016 | Jung | H04W 12/06 |
| 2016/0285630 A1* | 9/2016 | Abraham | H04L 9/0861 |
| 2016/0286398 A1* | 9/2016 | Abraham | H04L 63/065 |
| 2016/0286572 A1* | 9/2016 | Abraham | H04L 63/065 |
| 2016/0286573 A1* | 9/2016 | Abraham | H04L 63/065 |
| 2016/0286574 A1* | 9/2016 | Abraham | H04L 63/065 |
| 2016/0352863 A1* | 12/2016 | Patil | H04L 67/327 |

FOREIGN PATENT DOCUMENTS

| | | |
|---|---|---|
| WO | WO 2014/127104 | 8/2014 |
| WO | WO 2014/138229 | 9/2014 |
| WO | WO 2014/186593 | 11/2014 |

OTHER PUBLICATIONS

International Search Report dated Mar. 16, 2016 issued in counterpart application No. PCT/KR2015/012695, 10 pages.
European Search Report dated Apr. 13, 2016 issued in counterpart application No. 15196312.1-1854, 10 pages.
European Search Report dated Dec. 20, 2016 issued in counterpart application No. 15196312.1-1852, 14 pages.
European Search Report dated Apr. 10, 2017 issued in counterpart application No. 15196312.1-1854, 7 pages.

* cited by examiner

METHOD OF TRANSMITTING/RECEIVING SIGNAL IN PROXIMITY NETWORK AND ELECTRONIC DEVICE THEREOF

PRIORITY

This application claims priority under 35 U.S.C. §119(a) to Korean Application Serial No. 10-2014-0165566, which was filed in the Korean Intellectual Property Office on Nov. 25, 2014, the contents of which are incorporated herein by reference.

BACKGROUND

1. Field of the Disclosure

The present disclosure relates to a proximity network.

2. Description of the Related Art

Various types of proximity communication services using a wireless short-range communication technology have been developed. For example, a proximity network between adjacent electronic devices may be configured and a service for rapidly exchanging data through the proximity network may be provided. A proximity communication service includes a lower power proximity communication service using a Bluetooth® low energy (BLE) beacon or a lower power proximity communication service of a neighbor awareness networking (NAN) standard based on a wireless local area network (WLAN).

SUMMARY

A proximity communication service has a dynamically varying network. For example, the low power proximity communication service of the NAN standard configures a set of electronic devices included in a proximity network called a cluster, and the electronic devices included in the cluster transmit and receive signals such as a beacon and a service discovery frame (SDF) for discovery within a synchronized communication duration such as a discovery window. The electronic devices included in the cluster reduce power consumption by maintaining a low power state (i.e., a sleep state) in a duration other than the synchronized time duration.

The electronic devices included in the cluster perform a post operation such as Wi-Fi direct, mesh, or independent basic service set (IBSS), by using at least some duration of intervals between the synchronized communication duration, which is inefficient in the conventional art.

Accordingly, there is a need in the art for a method for electronic devices to more efficiently perform the post operation.

The present disclosure has been made to address the above-mentioned problems and disadvantages, and to provide at least the advantages described below.

Accordingly, an aspect of the present disclosure is to provide an electronic device and a method for sharing scheduling information for the post operation in each of the electronic devices included in the cluster through the proximity network.

Another aspect of the present disclosure provides an electronic device and a method for linking proximity network information and the post operation in each of the electronic devices included in the cluster through the proximity network.

In accordance with an aspect of the present disclosure, a method in an electronic device includes performing a first operation of transmitting a signal to at least one other electronic device in a first discovery window, and performing a second operation with the other electronic device as a post operation after the first operation within a predetermined duration among intervals between the first discovery window and a second discovery window after the first discovery window.

In accordance with another aspect of the present disclosure, an electronic device includes a communication interface, and a processor, wherein the processor controls the communication interface to perform a first operation of transmitting a signal to at least one other electronic device in a first discovery window and to perform a second operation with the other electronic device as a post operation after the first operation within a predetermined duration among intervals between the first discovery window and a second discovery window after the first discovery window.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE DISCLOSURE

Figure 1:
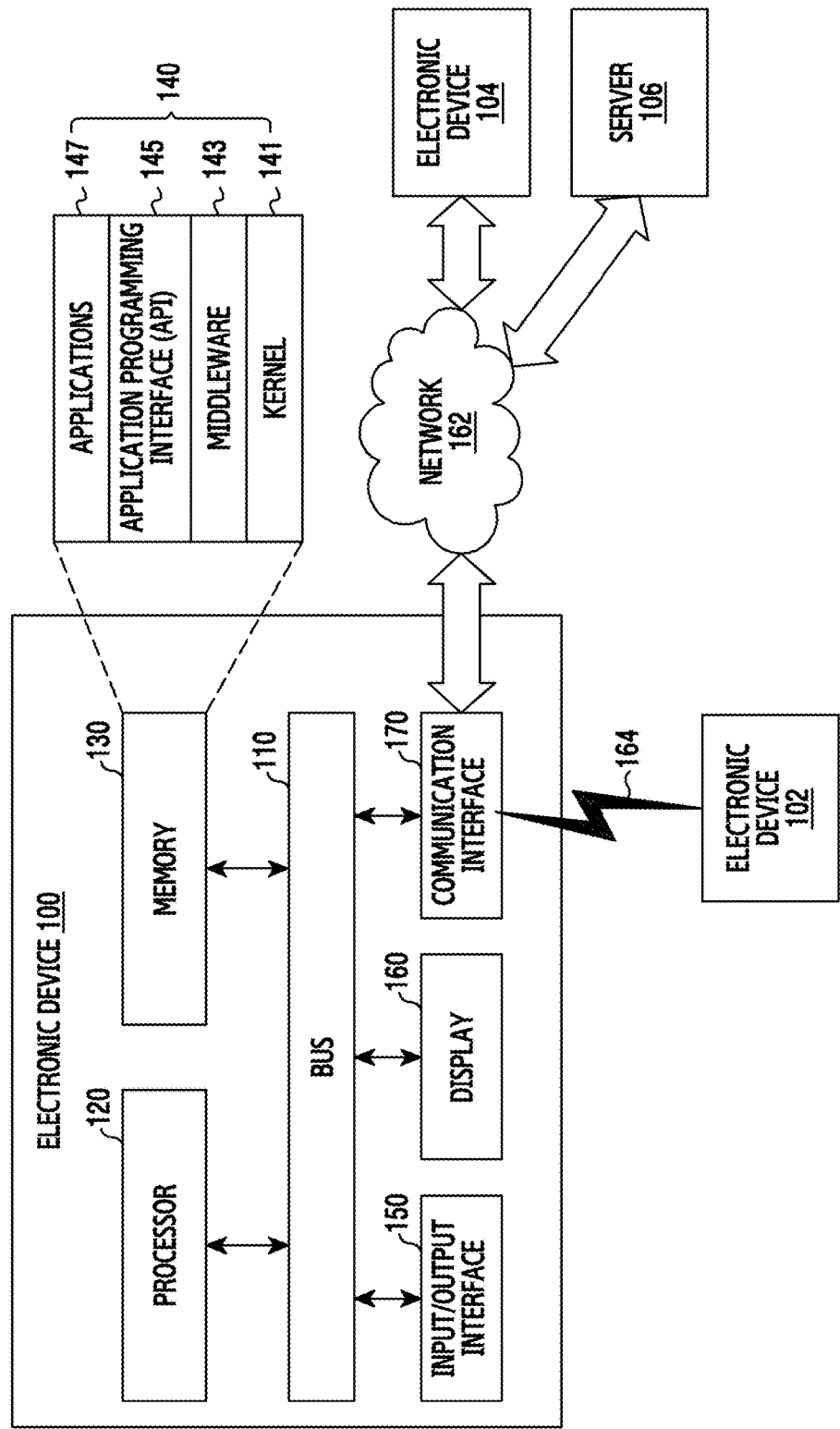
FIG. 1 is a block diagram of an electronic device according to an embodiment of the present disclosure.

Hereinafter, embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for the sake of clarity and conciseness.

Modifications may be made herein. Therefore, although the present disclosure will be described in detail with reference to particular embodiments shown in the accompanying drawings, the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the embodiments of the present disclosure indicate the presence of disclosed corresponding functions, operations, elements, and the like, and do not limit additional one or more functions, operations, elements, and the like. In addition, it should be understood that the terms "include" or "have" used in the embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the embodiments of the present disclosure include any and all combinations of words enumerated with it. For example, "A or B", "at least one of A and B" or "at least one of A or B" indicates (1) including at least one A, (2) including at least one B, or (3) including both at least one A and at least one B.

Although terms such as "first" and "second" used in embodiments of the present disclosure may modify various elements of embodiments, these terms do not limit the corresponding elements. For example, these terms do not limit an order and/or importance of the corresponding elements, and may be used for the purpose of distinguishing one element from another element. For example, a first user device and a second user device all indicate user devices and indicate different user devices. For example, a first element may be referred to as a second element without departing from the scope of right of embodiments of the present disclosure, and similarly, a second element may be referred to as a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in embodiments of the present disclosure may be replaced with "suitable for", "having the capacity to", "designed to", "adapted to", "made to", or "capable of" according to a situation. The term "configured to (set to)" does not necessarily indicate "specifically designed to" in a hardware level. Instead, the expression "apparatus configured to . . . " may indicate that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in embodiments of the present disclosure.

The module or program module according to embodiments of the present disclosure may further include at least one or more constitutional elements among the aforementioned constitutional elements, or may omit some of them, or may further include additional other constitutional elements. Operations performed by a module, programming module, or other constitutional elements according to embodiments of the present disclosure may be executed in a sequential, parallel, repetitive, or heuristic manner. In addition, some of the operations may be executed in a different order or may be omitted, or other operations may be added.

An electronic device according to embodiments of the present disclosure may include at least one of: a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device such as a head-mount-device (HMD), an electronic glasses, an electronic clothing, an electronic bracelet, an electronic necklace, an electronic appcessory, an electronic tattoo, a smart mirror, or a smart watch.

In other embodiments, an electronic device may be a smart home appliance such as at least one of a television (TV), a digital video disk (DVD) player, an audio component, a refrigerator, an air conditioner, a vacuum cleaner, an oven, a microwave oven, a washing machine, an air cleaner, a set-top box, a home automation control panel, a security control panel, a TV box such as Samsung HomeSync®, Apple TV®, or Google TV, a game console such as Xbox® PlayStation®, an electronic dictionary, an electronic key, a camcorder, or an electronic frame.

In other embodiments, an electronic device may include at least one of medical equipment including a mobile medical device such as a blood glucose monitoring device, a heart rate monitor, a blood pressure monitoring device or a temperature meter, a magnetic resonance angiography (MRA) machine, a magnetic resonance imaging (MRI) machine, a computed tomography (CT) scanner, or an ultrasound machine, a navigation device, a global positioning system (GPS) receiver, an event data recorder (EDR), a flight data recorder (FDR), an in-vehicle infotainment device, an electronic equipment for a ship such as ship navigation equipment and/or a gyrocompass, an avionics equipment, a security equipment, a head unit for vehicle, an industrial or home robot, an automatic teller's machine (ATM) of a financial institution, point of sale (POS) device at a retail store, or an Internet of Things device such as a light bulb, various sensors, an electronic meter, a gas meter, a sprinkler, a fire alarm, a thermostat, a streetlamp, a toaster, a sporting equipment, a hot-water tank, a heater, or a boiler.

In certain embodiments, an electronic device may include at least one of a piece of furniture or a building/structure, an electronic board, an electronic signature receiving device, a projector, and various measuring instruments such as a water meter, an electricity meter, a gas meter, or a wave meter.

An electronic device according to embodiments of the present disclosure may also include a combination of one or more of the above-mentioned devices, but is not limited to the above-mentioned devices.

Herein, the term "user" may indicate a person who uses an electronic device or an artificial intelligence electronic device that uses the electronic device.

The following embodiments of the present disclosure use terms and names defined in the Wi-Fi standard corresponding to the wireless local area network (LAN) standard for convenience of the description. However, the present disclosure is not limited to the terms and names and may be equally applied to a system according to another standard.

FIG. 1 is a block diagram of an electronic device according to an embodiment of the present disclosure.

Referring to FIG. 1, an electronic device 100 includes a bus 110, a processor 120, a memory 130, an input/output interface 150, a display 160, and a communication interface 170. According to embodiments of the present disclosure, at least one of the components of the electronic device 100 may be omitted, or other components may be additionally included in the electronic device 100.

The bus 110 may be a circuit that connects the processor 120, the memory 130, the input/output interface 150, the display 160, or the communication interface 170 and transmits communication such as control messages between the above described components.

The processor 120 includes one or more of a central processing unit (CPU), an application processor (AP), and a communication processor (CP). The processor 120, for example, performs operations or data processing related to control and/or communication of at least one other component of the electronic device 100.

According to an embodiment, the processor 120 configures a proximity network and controls to exchange data through a communication duration synchronized with other electronic devices included in the cluster of the proximity network. For example, the proximity network includes a network for a low power proximity communication service of a neighbor awareness networking (NAN) standard. For example, the synchronized communication duration includes a discovery window (DW) defined in the NAN standard. In the following description, the communication duration synchronized with the other electronic devices included in the cluster of the proximity network may be referred to as a "proximity network duration".

According to an embodiment, the processor 120 controls to perform a post operation with at least one other electronic device in a duration other than the proximity network duration. For example, the processor 120 may negotiate a post operation duration with at least one other electronic device through the proximity network duration. For example, the processor 120 controls to perform at least one post operation with at least one other electronic device among a wireless local area network (WLAN), peer to peer (P2P), an independent basic service set (IBSS), a mobile hotspot, Wi-Fi docking, a Wi-Fi serial BUS, and a Wi-Fi direct service (WFDS). For example, the post operation duration indicates at least some duration synchronized with at least one other electronic device among the proximity network duration to perform the post operation.

According to an embodiment, the processor 120 maps proximity network information and post operation information on another electronic device, which is included in the same cluster with the electronic device 100, performs the post operation with the electronic device 100 and manages the mapped information. For example, the processor 120 simplifies a communication connection for the post operation with the other electronic device by using the post operation information mapped to the proximity network information on the other electronic device. For example, the proximity network information includes an address of the other electronic device such as an interface address used in the proximity network. For example, the post operation information includes an address information of the other electronic device such as MAC or global address for the post operation, a service discovery result, and a result of the post operation with the other electronic device including at least one of a connection scheme for the post operation and connection information for the post operation.

According to an embodiment, the processor 120 controls to transmit state information such as active or sleep on the post operation through the proximity network. For example, the processor 120 controls to transmit state information on the post operation by using a service discovery frame (SDF) of the proximity network duration.

According to an embodiment, the processor 120 controls the post operation with another electronic device based on state information on the post operation of the other electronic device identified through the proximity network duration. For example, when it is identified that the post operation of the other electronic device is in a sleep state through the proximity network duration, the processor 120 may deactivate the post operation duration. The processor 120 may maintain a connection for the post operation with the other electronic device based on the state information on the post operation received through the proximity network duration. For example, when it is identified that the post operation of the other electronic device is in an active state through the proximity network duration, the processor 120 activates the post operation duration.

According to an embodiment, the processor 120 controls the post operation based on state information on the proximity network. For example, when a proximity network connection with another electronic device is released, the processor 120 releases a communication connection for the post operation with the other electronic device. For example, when the proximity network connection with the other electronic device is made again, the processor 120 may make the communication connection for the post operation by using pre-stored information on the post operation with the other electronic device.

The memory 130 includes a volatile memory and/or a non-volatile memory. The memory 130 stores commands or data such as a reference pattern or a reference touch area related to one or more other components of the electronic device 100. According to an embodiment, the memory 130 stores software and/or a program 140. For example, the program 140 includes a kernel 141, middleware 143, an application programming interface (API) 145, or applications 147. At least some of the kernel 141, the middle 143, and the API 145 may be referred to as an operating system (OS).

The kernel 141 controls or manages system resources such as the bus 110, the processor 120, or the memory 130 used for executing an operation or function implemented by other programs such as the middleware 143, the API 145, or the applications 147. The kernel 141 provides an interface through which the middleware 143, the API 145, or the applications 147 access individual components of the electronic device 100 to control or manage the system resources.

The middleware 143 serves as an intermediary that allows the API 145 or the applications 147 to communicate with the kernel 141 to exchange data. The middleware 143 controls task requests received from the applications 147. For example, the middleware 143 controls task requests by using a method of assigning priorities, by which the system resources of the electronic device 100 can be first used, to at least one of the applications 147.

The API 145 is an interface by which the applications 147 control functions provided from the kernel 141 or the middleware 143, and includes a function such as command. For example, the API 145 includes at least one interface for file control, window control, image processing, or text control.

The input/output interface 150 serves as an interface capable of transferring a command or data, which is input from a user or another external device, to other component(s) of the electronic apparatus 100. Also, the input/output interface 150 outputs, to the user or another external device, commands or data received from other component(s) of the electronic device 100.

The display 160 includes, for example, a liquid crystal display (LCD), a light emitting diode (LED) display, an organic light emitting diode (OLED) display, a micro electro mechanical system (MEMS) display, or an electronic paper display. The display 160 displays various types of content such as text, images, videos, icons, and symbols for the user, includes a touch screen, and receives a touch, gesture, proximity, or hovering input using an electronic pen or the user's body part such as a finger.

The communication interface 170 connects communication between the electronic device 100 and an external electronic device such as a first external electronic device 102, a second external electronic device 104, or a server 106. For example, the communication interface 170 may be connected to a network 162 through wireless communication or wired communication, and may communicate with an external electronic device.

The wireless communication includes at least one of, for example, Wi-Fi, Bluetooth®, near field communication (NFC), Bluetooth® low energy (BLE), and a global positioning system (GPS) as a short-range communication protocol 164. Additionally or alternatively, the wireless communication may use at least one of long term evolution (LTE), LTE-advanced (LTE-A), code division multiple access (CDMA), wideband CDMA (WCDMA), universal mobile telecommunications system (UMTS), wibro (Wireless Broadband), and global system for mobile communication (GSM) as a cellular communication protocol.

The wired communication includes at least one of a universal serial bus (USB), a high definition multimedia interface (HDMI), recommended standard 232 (RS-232), and a plain old telephone service (POTS).

The network 162 includes a telecommunication network, such as a LAN or a WAN, Internet, and a telephone network.

According to embodiments of the present disclosure, the electronic device 100 performs a service and a post operation using a proximity network with at least one other electronic device through at least one module functionally or physically separated from the processor 120.

Figure 2:
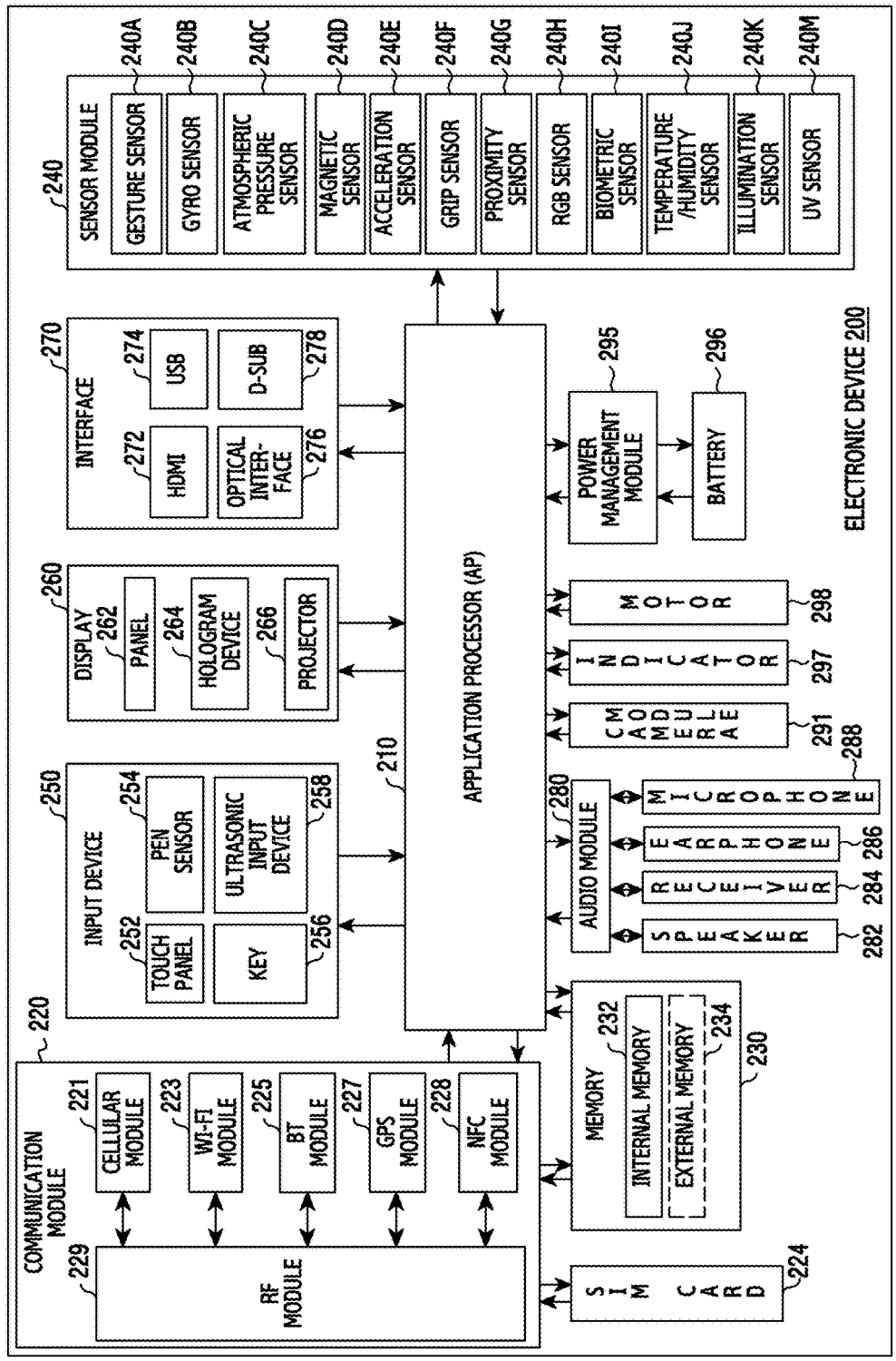
FIG. 2 is a detailed block diagram of an electronic device according to an embodiment of the present disclosure.

FIG. 2 is a block diagram of an electronic device according to an embodiment of the present disclosure. In the following description, an electronic device 200 forms a part or the entirety of the electronic device 100 illustrated in FIG. 1.

Referring to FIG. 2, the electronic device 200 includes one or more application processors (APs) 210, a communication module 220, a subscriber identification module (SIM) card 224, a memory 230, a sensor module 240, an input electronic device 250, a display 260, an interface 270, an audio module 280, a camera module 291, a power management module 295, a battery 296, an indicator 297, and a motor 298.

The AP 210 drives an operating system or an application program so as to control a plurality of hardware or software components connected to the AP 210, and executes data processing and operation associated with various data including multimedia data. The AP 210 may be implemented by, for example, a system on chip (SoC), and may further include a graphic processing unit (GPU).

The communication module 220 (for example, the communication interface 170) performs data transmission/reception in communication between the electronic device 200 and other electronic devices connected thereto through the network. According to an embodiment, the communication module 220 includes a cellular module 221, a Wi-Fi module 223, a Bluetooth® (BT) module 225, a GPS module 227, an NFC module 228, and a Radio Frequency (RF) module 229.

The cellular module 221 provides a voice call, a video call, a short message service (SMS), or an Internet service through a communication network such as LTE, LTE-A, CDMA, WCDMA, UMTS, WiBro, or GSM, and distinguishes between and authenticate electronic devices in a communication network using, for example, a subscriber identification module such as the SIM card 224). According to an embodiment, the cellular module 221 performs at least some of the functions that the AP 210 provides, such as at least some of the multimedia control functions.

According to an embodiment, the cellular module 221 includes a communication processor (CP) and may be implemented by, for example, an SoC. Although the components such as the cellular module 221 such as the communication processor, the memory 230, and the power management module 295 are illustrated as components separated from the AP 210, the AP 210 may include at least some of the above described components according to an embodiment.

According to an embodiment, the AP 210 or the cellular module 221 loads a command or data received from at least one of a non-volatile memory and other components connected thereto to a volatile memory and process the loaded command or data. The AP 210 or the cellular module 221 stores data received from or generated by at least one of other components in a non-volatile memory.

For example, each of the Wi-Fi module 223, the BT module 225, the GPS module 227, and the NFC module 228 include a processor for processing data transmitted/received through the corresponding module. Although each of the cellular module 221, the Wi-Fi module 223, the BT module 225, the GPS module 227, and the NFC module 228 is shown as a separate block in FIG. 2, at least two of these modules may be included in one integrated chip (IC) or IC package according to an embodiment. For example, at least two of these modules may be implemented as one SoC.

The RF module 229 transmits and receives data such as RF signals, and includes a transceiver, a power amp module (PAM), a frequency filter, a low noise amplifier (LNA), for example. The RF module 229 further includes a component for transmitting and receiving an electromagnetic wave in the free airspace in wireless communication, for example, a conductor or a conductive wire. Although each module in the communication module 220 is illustrated in FIG. 2, at least one of these modules may transmit and receive the RF signal through a separate RF module according to an alternate embodiment.

According to an embodiment, the RF module 229 includes at least one of a main antenna and a sub antenna, which are functionally connected to the electronic device 200. The communication module 220 supports a multiple input multiple output (MIMO) service such as diversity by using the main antenna and the sub antenna.

The SIM card 224 includes a SIM and may be inserted into a slot formed in a predetermined position of the electronic device. The SIM card 224 includes unique identification information such as an integrated circuit card identifier (ICCID) or unique subscriber information such as an international mobile subscriber identity (IMSI).

The memory 230 includes an internal memory 232 and, optionally, an external memory 234. The internal memory 232 includes at least one of a volatile memory such as a dynamic random access memory (DRAM), a static RAM (SRAM), a synchronous dynamic RAM (SDRAM), and a non-volatile memory such as a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, and a NOR flash memory.

According to an embodiment, the internal memory 232 may be a solid state drive (SSD. The external memory 234 may further include a flash drive such as a compact flash (CF), a secure digital (SD), a micro secure digital (Micro-SD), a mini secure digital (Mini-SD), an extreme digital (xD), and a Memory Stick. The external memory 234 may be functionally connected to the electronic device 200 through various interfaces, and the electronic device 200 may further include a storage medium such as a hard disc drive.

The sensor module 240 measures a physical quantity or senses an operational state of the electronic device 200 and converts the measured or sensed information to an electric signal. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H such as a Red/Green/Blue (RGB) sensor, a biometric sensor 240I, a temperature/humidity sensor 240J, an illumination sensor 240K, and an ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an Infrared (IR) sensor, an iris sensor, and a fingerprint sensor. The sensor module 240 may further include a control circuit for controlling one or more sensors included therein.

The input electronic device 250 includes a touch panel 252, a (digital) pen sensor 254, a key 256, and an ultrasonic input electronic device 258. The touch panel 252 recognizes a touch input in at least one of a capacitive type, a resistive type, an infrared type, and an acoustic wave type, for example, and further includes a control circuit. A capacitive touch panel recognizes a physical contact or proximity, and further includes a tactile layer. In this case, the touch panel 252 provides a user with a tactile reaction.

The (digital) pen sensor 254 may be implemented, for example, using a method identical or similar to a method of receiving a user's touch input, or using a separate recognition sheet. The key 256 includes, for example, a physical button, an optical key, or a keypad. The ultrasonic input electronic device 258 detects a micro acoustic wave by a microphone of the electronic device 200 through an input generating an ultrasonic signal to identify data and performs wireless recognition. According to an embodiment, the electronic device 200 may also receive a user input from an external electronic device such as a computer or a server connected thereto by using the communication module 220.

The display 260 includes a panel 262, a hologram electronic device 264 and a projector 266. For example, the panel 262 is a liquid crystal display (LCD), or an active matrix organic light emitting diode (AM-OLED), and may be flexible, transparent, or wearable. The panel 262 and the touch panel 252 may be implemented as one module. The hologram electronic device 264 shows a stereoscopic image in the air by using interference of light. The projector 266 displays an image by projecting light onto a screen. The screen may be located inside or outside the electronic apparatus 200. According to an embodiment, the display 260 may further include a control circuit for controlling the panel 262, the hologram device 264, or the projector 266.

The interface 270 includes a high-definition multimedia interface (HDMI) 272, a universal serial bus (USB) 274, an optical interface 276, and a D-subminiature (D-sub) 278. Additionally or alternatively, the interface 270 includes a mobile high-definition link (MHL) interface, a secure digital (SD) card/multi-media card (MMC) interface, or an infrared data association (IrDA) interface.

The audio module 280 bidirectionally converts a sound and an electrical signal, and processes sound information which is input or output through a speaker 282, a receiver 284, earphones 286, or a microphone 288.

The camera module 291 is an electronic device for photographing still and moving images, and includes one or more image sensors such as a front sensor or a rear sensor, a lens, an image signal processor (ISP), or a flash such as an LED or a xenon lamp.

The power management module 295 manages power of the electronic device 200 and includes, for example, a power management integrated circuit (PMIC), a charger IC, or a battery gauge.

The PMIC is mounted within, for example, an integrated circuit or an SoC semiconductor. Charging methods are classified into a wired charging method and a wireless charging method. The charger IC charges a battery and prevents an overvoltage or excess current from being induced or flowing from a charger. According to an embodiment, the charger IC includes a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge measures, for example, a residual quantity of the battery 296, and a voltage, a current, or a temperature during the charging. The battery 296 stores or generates electricity and supplies power to the electronic device 200 by using the stored or generated electricity. The battery 296 includes a rechargeable battery or a solar battery.

The indicator 297 displays a predetermined state of the electronic device 200 or a part of the electronic device 200, such as a booting state, a message state, or a charging state. The motor 298 converts an electrical signal into a mechanical vibration. The electronic apparatus 200 includes a processing electronic device such as a GPU for supporting a mobile TV. The processing electronic device processes, for example, media data pursuant to a certain standard of digital multimedia broadcasting (DMB), digital video broadcasting (DVB), or media flow.

Each of the above described elements of the electronic device according to embodiments of the present disclosure may be formed of one or more components, and the name of a corresponding element may vary according to the type of an electronic device. The electronic device according to embodiments of the present disclosure may include at least one of the above described elements and may exclude some of the elements or further include other additional elements. Some of the elements of the electronic device may be coupled to form a single entity while performing the same functions as those of the corresponding elements before the coupling.

According to embodiments of the present disclosure, an electronic device includes a communication interface for communicating with another electronic device through a proximity network, and a processor for configuring a cluster together with another electronic device through the proximity network. The processor controls the communication interface to transmit information for a post operation within a synchronized communication duration of the cluster, to receive a response signal on the information for the post operation, and to communicate with at least one other electronic device for the post operation duration based on the response information.

According to embodiments, the proximity network includes a wireless short-range network to which a NAN standard is applied.

The post operation includes at least one WLAN, peer to peer (P2P), independent basic service set (IBSS), mobile hotspot, Wi-Fi docking, Wi-Fi serial bus, and Wi-Fi direct service (WFDS).

The processor controls to transmit a service discovery frame including information on the post operation within a synchronized communication duration of the cluster through the communication interface.

The information for the post operation may be included in one of a reserved area, a vendor specific attribute area, and a service descriptor attribute area of an NAN attribute field of the service discovery frame and transmitted.

The information for the post operation may be transmitted while including a service information (i.e., service info) field of the service descriptor attribute area.

The information for the post operation includes at least one of the type of post operation method, an address for the post operation, a channel for the post operation, and an active time of the post operation duration.

The information for the post operation further includes at least one of an electronic device list for performing the post operation, effective time information on the information for the post operation, and identification information on the information for the post operation.

The electronic device further includes a memory, and the processor controls to map a proximity network address of the at least one other electronic device and a result of the post operation with the at least one other electronic device and to store the mapped information in the memory.

The processor controls to perform a service discovery procedure with the at least one other electronic device or perform a communication connection procedure with the at least one other electronic device, and then to map the proximity network address of the at least one other electronic device and the result of the post operation with the at least one other electronic device and store the mapped information.

The result of the post operation includes at least one of a post operation address of the other electronic device, a service discovery result, a connection method, and personal information on the other electronic device.

The processor controls to transmit state information on the post operation within the synchronized communication duration of the cluster through the communication interface.

Figure 3:
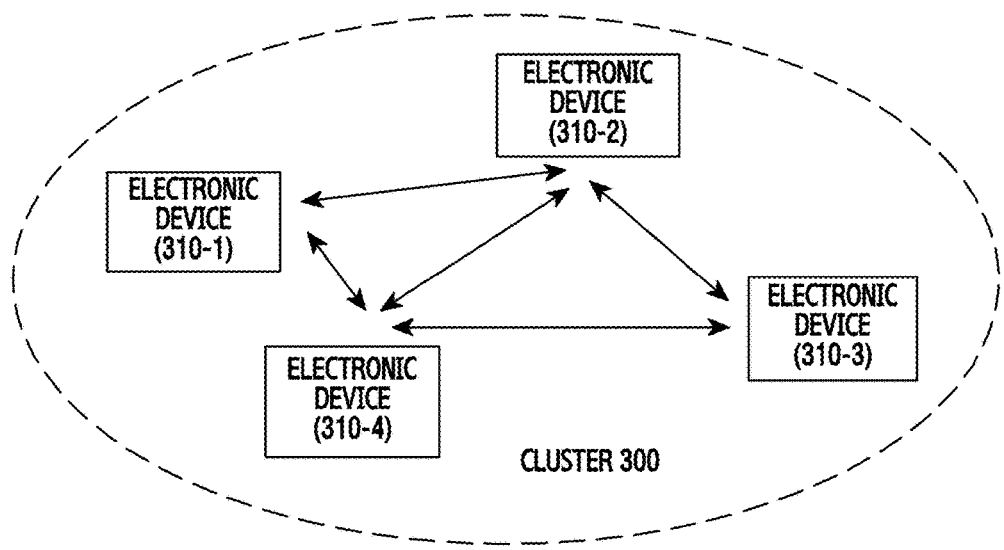
FIG. 3 illustrates a configuration of a cluster for a proximity network according to embodiments of the present disclosure.

FIG. 3 illustrates a configuration of a cluster for a proximity network according to embodiments of the present disclosure. In the following description, the cluster 300 refers to a set of electronic devices included in the proximity network to mutually transmit and receive data. For example, the cluster 300 may be referred to as an NAN cluster according to the NAN standard.

Referring to FIG. 3, a plurality of electronic devices 310-1, 310-2, 310-3, and 310-4 is included in one cluster, and the electronic devices are synchronized and exchange data based on an appointed protocol. For example, the plurality of electronic devices 310-1, 310-2, 310-3, and 310-4 performs discovery, synchronization, and data exchange operations by using a protocol illustrated in FIG. 4 as follows.

Figure 4:
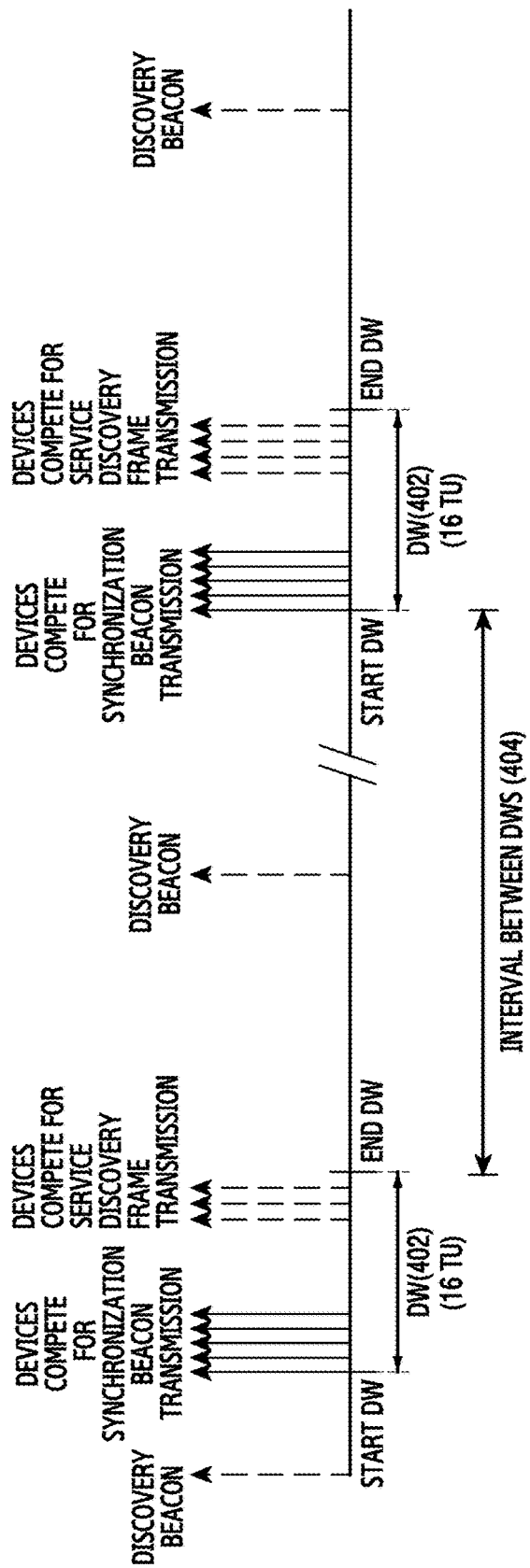
FIG. 4 illustrates a signal transmission protocol in a proximity network according to embodiments of the present disclosure.

FIG. 4 illustrates a signal transmission protocol in a proximity network according to embodiments of the present disclosure. Hereinafter, an example in which electronic devices included in one cluster transmit signals through a particular channel based on the NAN standard will be described.

Referring to FIG. 4, the electronic devices transmit a synchronization beacon and a service discovery frame (SDF) within a synchronized discovery window (DW) duration 402 defined in the NAN standard and transmits a discovery beacon within a duration 404 such as an interval between the DW duration other than the DW duration. For example, the electronic devices transmit the synchronization beacon and the service discovery frame based on contention. For example, the DW 402 occupies 16 time units based on the NAN standard, and exists with intervals of 512 time units.

The discovery beacon is a signal transmitted to allow another electronic device, which has not joined the cluster, to discover the cluster. That is, the discovery beacon informs of the existence of the cluster, and electronic devices, which have not joined the corresponding cluster, perform a passive scan to detect the discovery beacon and join the corresponding cluster.

The discovery beacon includes information required for synchronization with the cluster. For example, the discovery beacon includes at least one of a frame control (FC) field indicating a signal function such as a beacon, a broadcast address, a media access control (MAC) address of a transmission electronic device, a cluster identifier, a sequence control field, a time stamp of a beacon frame, a beacon interval field indicating an transmission interval of the discovery beacon, and capability information on the transmission electronic device. The discovery beacon includes at least one proximity network-related information element. The proximity network-related information may be referred to as attribute information.

The synchronization beacon is a signal for maintaining synchronization between synchronized electronic devices within the cluster, and includes information required for synchronization with the corresponding cluster. For example, the synchronization beacon includes at least one of an FC field indicating a signal function (for example, beacon), a broadcast address, a MAC address of a transmission electronic device, a cluster identifier, a sequence control field, a time stamp of a beacon frame, a beacon interval field indicating an interval between start points of the DW 402, and capability information on the transmission electronic device. The synchronization beacon includes at least one proximity network-related information element. For example, the proximity network-related information includes contents for a service provided through the proximity network.

The service discovery frame is a signal for exchanging data through the proximity network, and is a vender specific public action frame and includes various fields. For example, the service discovery frame includes category and action fields and at least one piece of proximity network-related information.

As described above, the discovery beacon, the synchronization beacon, and the service discovery frame include the proximity network-related information. The proximity network-related information includes an identifier indicating the type of information, an information length, and a body field indicating the corresponding information. For example, the corresponding information included in the proximity network-related information includes at least one piece of master indication information, cluster information, service identifier list information, service descriptor information, connection capability information, wireless LAN infrastructure information, P2P operation information, independent basic service set (IBSS) information, mesh information, additional proximity network service discovery information, further availability map information, country code information, ranging information, cluster discovery information, and vender specific information.

Figure 5:
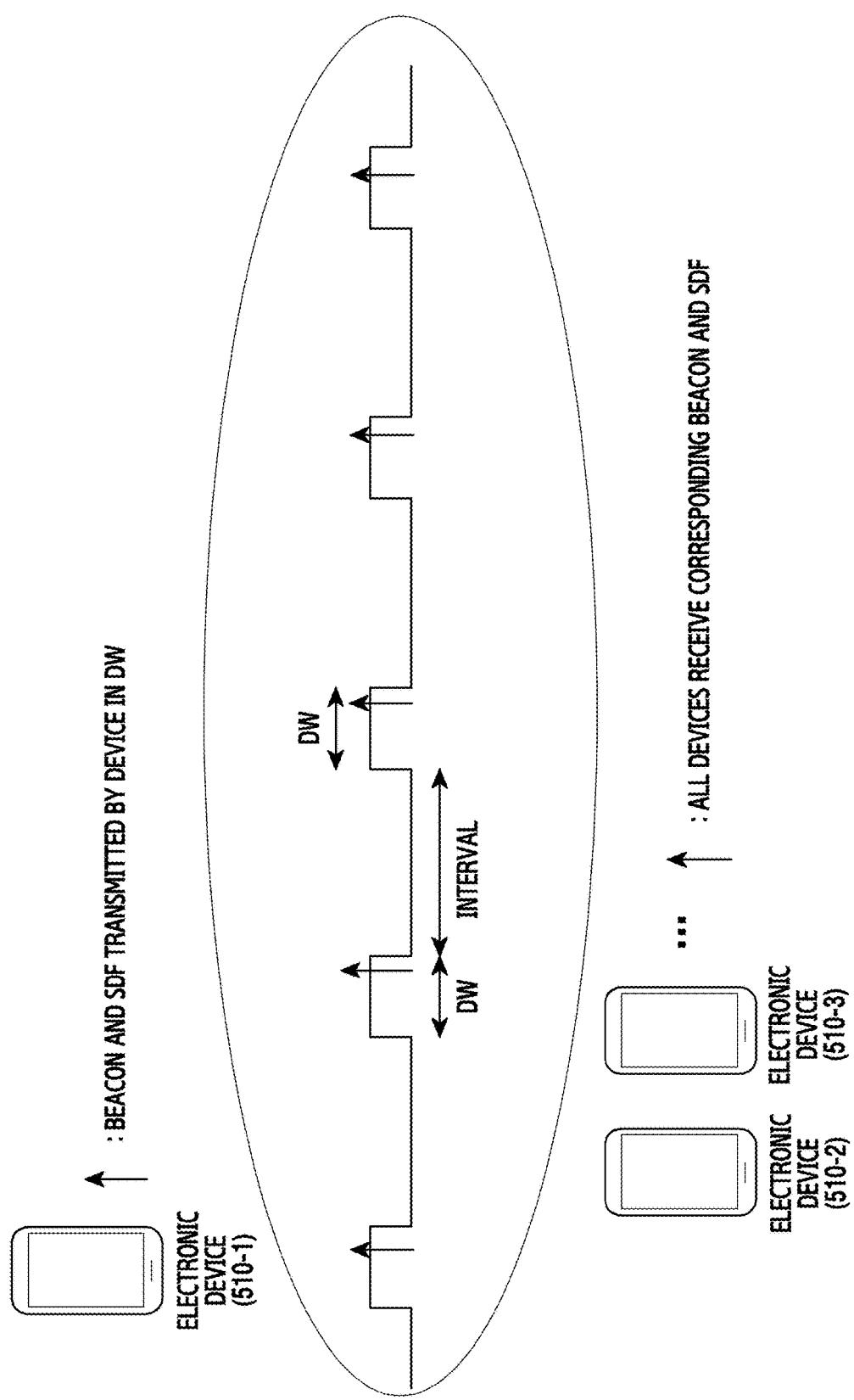
FIG. 5 illustrates data transmission/reception in the proximity network according to embodiments of the present disclosure.

FIG. 5 illustrates data transmission/reception in the proximity network according to embodiments of the present disclosure. In the following description, one electronic device such as 510-1 of electronic devices included in the cluster serves as a master electronic device.

Referring to FIG. 5, the electronic device 510-1 transmits a beacon and a service discovery frame within the DW. An electronic device 510-2 and an electronic device 510-3 receive a beacon and a service discovery frame transmitted by the electronic device 510-1. The beacon transmitted within the DW is a synchronization beacon and includes information for maintaining synchronization between the electronic devices 510-1 to 510-3.

In a duration other than the DW, the electronic devices 510-1 to 510-3 maintain a sleep state to reduce power consumption. For example, the electronic devices 510-1 to 510-3 operate in a wake state only within the DW duration based on a synchronized time clock, thereby reducing power consumption.

Figure 6:
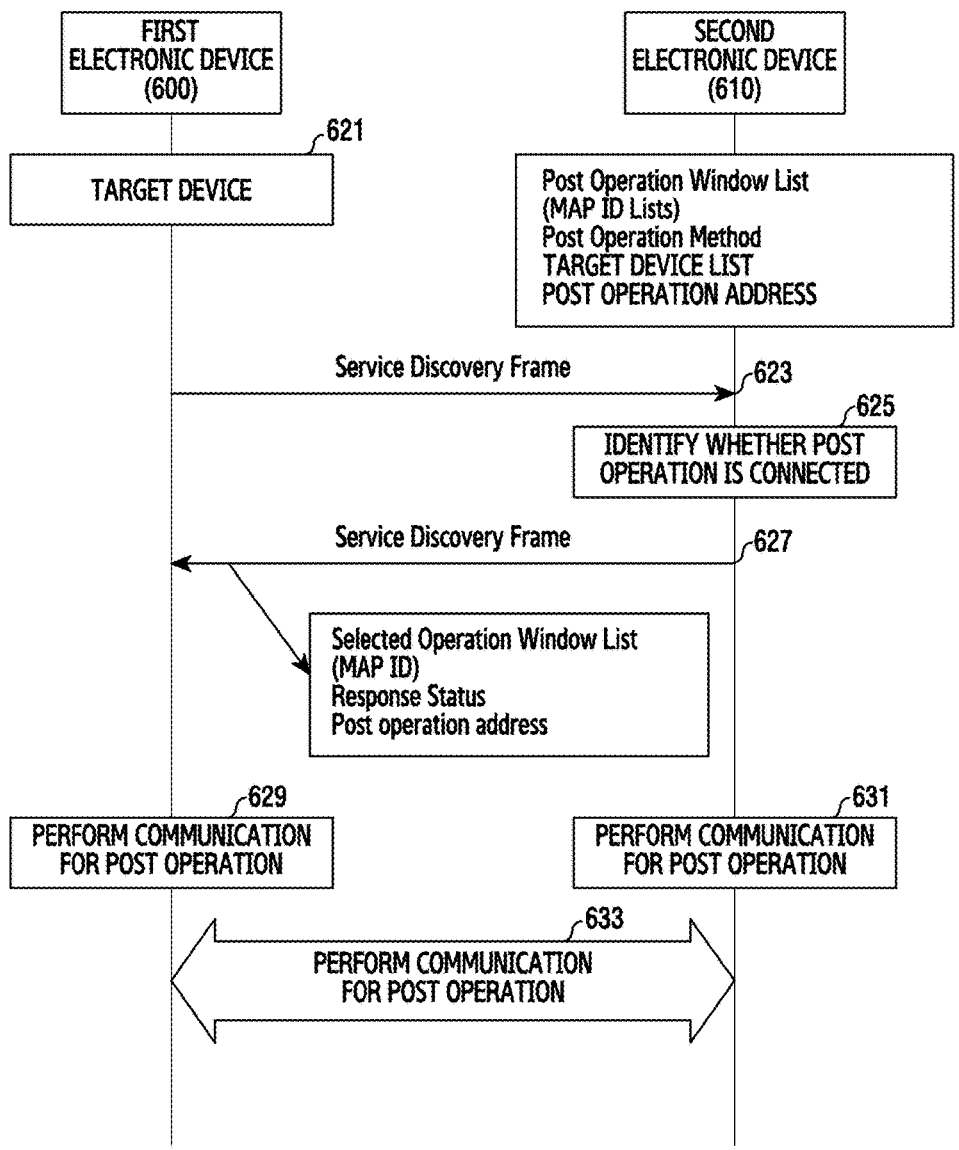
FIG. 6 illustrates a process for transmitting signals to negotiate a post operation duration according to embodiments of the present disclosure.

FIG. 6 illustrates a signal flow to negotiate a post operation duration according to embodiments of the present disclosure.

Referring to FIG. 6, a first electronic device 600 and a second electronic device 610 may be synchronized in one cluster in the proximity network.

The first electronic device 600 selects at least one target electronic device such as the second electronic device 610 for further operations from one or more other electronic devices included in the cluster (621). For example, the first electronic device 600 selects at least one target electronic device from an NAN discovery list based on user input information, selects at least one target electronic device based on a service ID or a device ID acquired by the NAN discovery, and selects at least one target electronic device based on a contact list stored in the first electronic device 600 or a predefined device ID.

The first electronic device 600 transmits an SDF including scheduling information for a post operation within a synchronized communication duration in the cluster of the proximity network (623). For example, the scheduling information includes at least one of at least one post operation duration list, the type of post operation method, and a post operation address such as a MAC address or a global address. Additionally, the first electronic device 600 adds a target electronic device list to the scheduling information for the post operation to allow only the target electronic device within the cluster to receive the scheduling information for the post operation. That is, when the scheduling information for the post operation does not include the target electronic device list, all the electronic devices within the cluster receive the corresponding service discovery frame of the first electronic device 600 and determine a post operation duration with the first electronic device 600. For example, the post operation duration list includes at least one of a channel for the post operation, an active time of the post operation duration, a period, an effective timeout of the scheduling information, and identification information such as a MAP ID for identifying the post operation list.

The second electronic device 610 receives the service discovery frame including the scheduling information for the post operation from the first electronic device 600 (623). For example, the second electronic device 610 selectively receives the corresponding service discovery frame by using the target electronic device list included in the service discovery frame, and determines whether to receive the corresponding service discovery frame by using at least one of an NAN interface address of the target electronic device included in the target electronic device list, a service ID, a cluster ID, and a device ID.

The second electronic device 610 determines whether the post operation is connected to the first electronic device 600 based on the scheduling information for the post operation included in the service discovery frame (625). For example, the second electronic device 610 determines whether to accept the post operation of the first electronic device 600 included in the service discovery frame, and selects at least one post operation duration list among a plurality of post operation duration lists included in the service discovery frame.

The second electronic device 610 transmits the SDF including response information on the post operation within the DW (627). For example, the second electronic device 610 broadcasts the service discovery frame including information on whether to accept the post operation or post operation duration list information selected by the second electronic device 610 to a service area. Additionally, the second electronic device 610 adds identification information such as an address for the post operation of the second electronic device 610 for the post operation to the service discovery frame.

When the second electronic device 610 accepts the post operation or when the second electronic device 610 selects the post operation duration list, the first electronic device 600 activates the corresponding post operation duration (629). When the second electronic device 610 accepts the post operation with the first electronic device 600, the second electronic device 610 activates the post operation duration provided from the first electronic device 600 (631).

The first electronic device 600 and the second electronic device 610 perform communication for the post operation within the post operation duration (633), such as service discovery and connection procedures for a communication connection for the post operation during the post operation duration.

Figure 7:
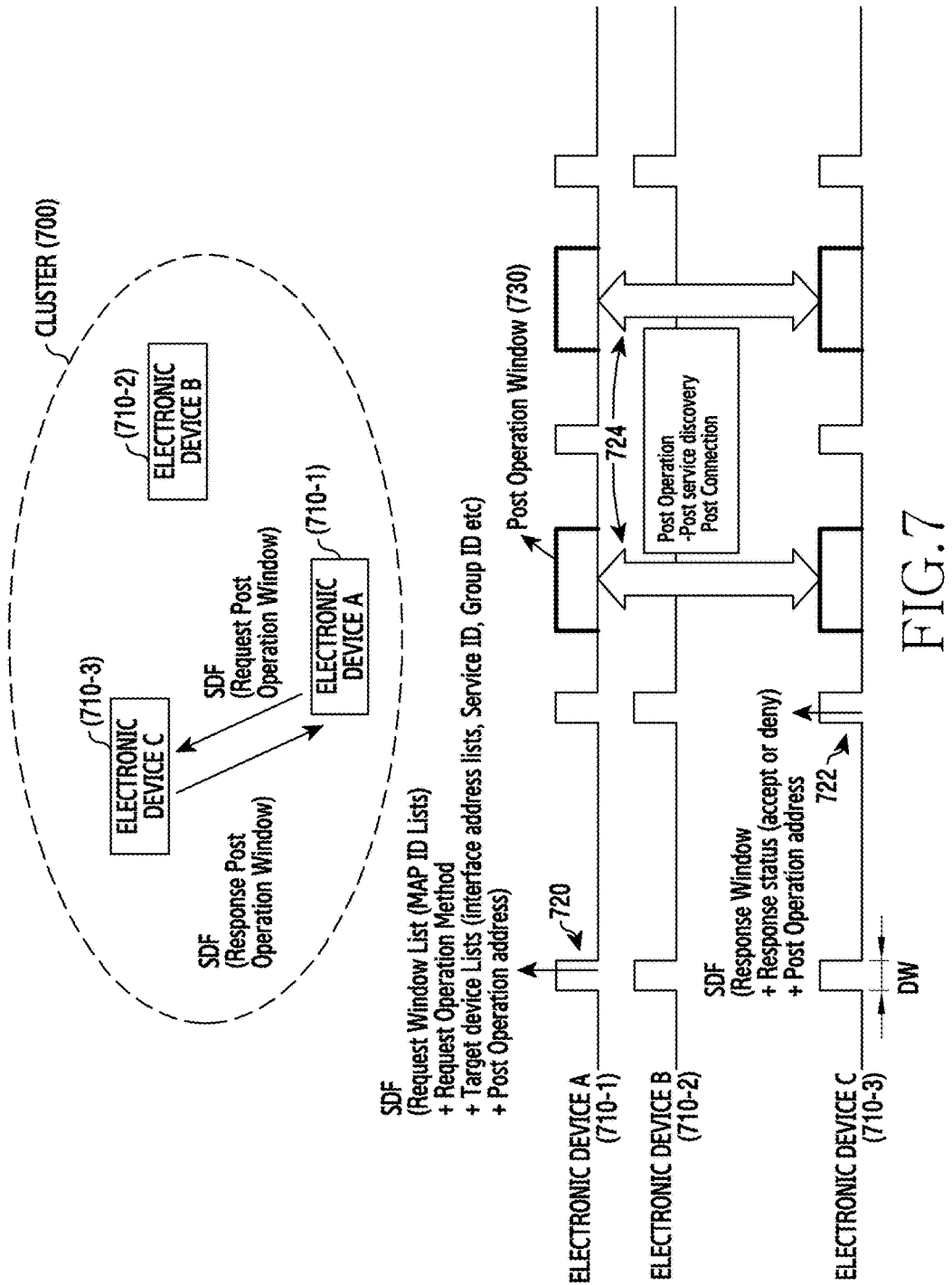
FIG. 7 illustrates an example for negotiating a post operation duration according to embodiments of the present disclosure.

FIG. 7 illustrates an example for negotiating post operation duration according to embodiments of the present disclosure.

Referring to FIG. 7, an electronic device A 710-1, an electronic device B 710-2, and an electronic device C 710-3 may be synchronized in one cluster 700 for the proximity network.

According to an embodiment, when the electronic device A 710-1 selects the electronic device C 710-3 as a target electronic device for the post operation, the electronic device A 710-1 transmits the SDF including scheduling information for the post operation within a synchronized communication duration in the cluster of the proximity network as indicated by reference numeral 720.

The electronic device C 710-3 receives the service discovery frame including the scheduling information for the post operation from the electronic device A 710-1 in the DW. For example, the electronic device C 710-3 selectively receives the service discovery frame based on the target electronic device list included in the service discovery frame.

The electronic device C 710-3 transmits the service discovery frame including response information on the post operation with the electronic device A 710-1 within the DW, generates a reception notification event of the scheduling information for the post operation received from the electronic device A 710-1, determines whether to accept the post operation with the electronic device A 710-1 based on user input information on the reception notification event, and transmits the service discovery frame including information on whether to accept the post operation.

According to an embodiment, when the electronic device C 710-3 accepts the post operation with the electronic device A 710-1, the electronic device A 710-1 and the electronic device C 710-3 activate post operation duration 730 and perform the post operation as indicated by reference numeral 724.

In FIG. 7, the electronic device A 710-1 and the electronic device C 710-3 transmit the service discovery frame including the scheduling information for the post operation and the service discovery frame including the response information on the post operation in different DWs.

According to embodiments of the present disclosure, the electronic device A 710-1 and the electronic device C 710-3 also transmit the service discovery frame including the scheduling information for the post operation and the service discovery frame including the response information on the post operation within the same DW.

According to embodiments of the present disclosure, when the electronic device A 710-1 selects a plurality of other electronic devices such as the electronic device B 710-2 and the electronic device C 710-3 as target electronic devices, the electronic device A 710-1 determines post operation duration of the electronic device A 710-1 based on post operation lists selected by the plurality of other electronic devices. For example, when the electronic device B 710-2 and the electronic device C 710-3 select different post operation lists, the electronic device A 710-1 configures a post operation duration to include post operation lists selected by the electronic device B 710-2 and the electronic device C 710-3.

Figure 8:
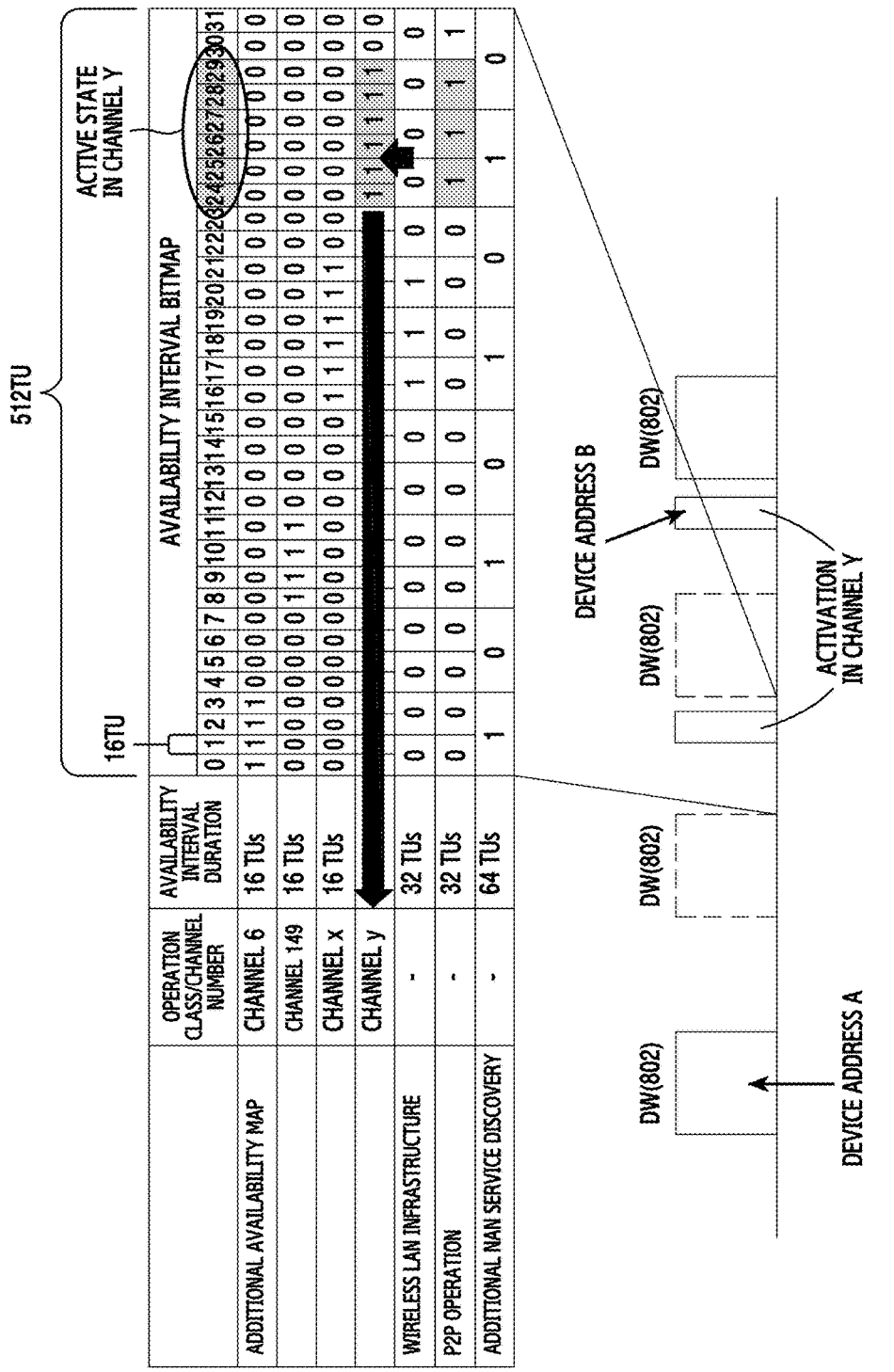
FIG. 8 illustrates a configuration of scheduling information on the post operation in the proximity network according to embodiments of the present disclosure.

FIG. 8 illustrates a configuration of scheduling information on the post operation in the proximity network according to embodiments of the present disclosure.

Referring to FIG. 8, the scheduling information includes a list of operation classes/channel numbers, and includes the number such as 16, 32, or 64 of time units of the resource unit in each channel.

An availability interval bitmap included in the scheduling information indicates an active time duration within which an operation of each channel is performed. For example, in FIG. 8, the active time duration is expressed by "1". More specifically, the availability interval bitmap indicates that channel 6 is used for nos. 0 to 3 intervals, channel 149 is used for nos. 8 to 11 intervals, channel x is used for nos. 16 to 21 intervals, and channel y is used for nos. 24 to 29 intervals.

The active time duration of each channel may be used for a wireless LAN connection, a P2P operation, and a post proximity network service discovery. For example, in FIG. 8, the availability interval bitmap indicates that the wireless LAN connection is used for nos. 16 to 21 intervals, the P2P operation is used for nos. 24 to 29 intervals, and the post proximity network service discovery is performed for nos. 0 to 3, 8 to 11, 16 to 19, and 24-27 intervals.

The lower part of FIG. 8 illustrates a power operation duration and a DW 802 for the P2P operation. Referring to the lower part of FIG. 8, the electronic device provides a communication service using the proximity network based on electronic device address A during the DW 802 and performs the P2P operation based on electronic device address B during the post operation duration, i.e., a duration other than the DW. For example, the corresponding electronic device wakes up in channel y during the nos. 24 to 29 intervals corresponding to the post operation duration among the duration other than the DW and performs the P2P operation.

The embodiment of FIG. 8 illustrates transmission of one post availability map. However, according to embodiments of the present disclosure, a plurality of post availability maps can be transmitted. In this case, the plurality of maps may be distinguished by pieces of different identification information such as MAP IDs.

Figure 9:
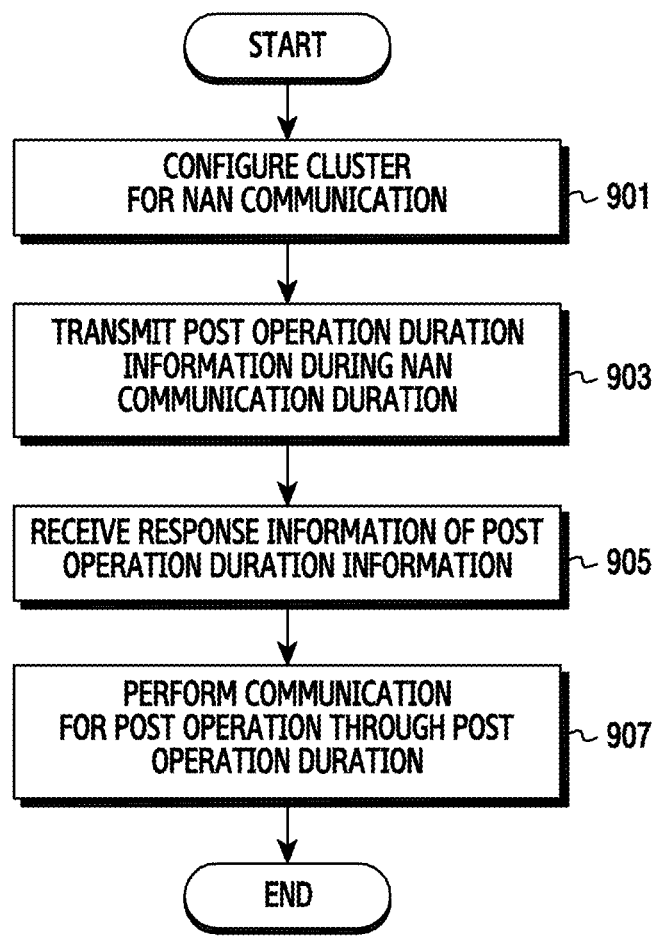
FIG. 9 illustrates a process in which the electronic device negotiates a post operation duration according to embodiments of the present disclosure.

FIG. 9 illustrates a process in which the electronic device negotiates a post operation duration according to embodiments of the present disclosure.

Referring to FIG. 9, in operation 901, the electronic device configures a cluster for NAN communication such as a proximity network. For example, the electronic device may be synchronized with at least one other electronic device included in the cluster for the NAN communication.

In operation 903, the electronic device transmits post operation duration information within a synchronized communication duration in the cluster of the proximity network. For example, the electronic device broadcasts the service discovery frame including scheduling information for the post operation within the DW to a service area, and the scheduling information includes at least one of at least one post operation duration list, the type of post operation, and a post operation address. The post operation duration list includes at least one of a channel for the post operation, an active time of the post operation duration, a period, an effective timeout of the scheduling information, and identification information for identifying the post operation list.

According to an embodiment, in the NAN standard, the electronic device generates a NAN service discovery frame as shown in Table 1 as follows.

TABLE 1

| Field | Size (Octets) | Value (Hex) | Description |
| --- | --- | --- | --- |
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | 0x13 | Identifying the type and version of the NAN |
| NAN Attributes | Variable | Variable | One or more NAN Attributes |

The NAN service discovery frame of Table 1 includes a category field, an action field, an organizationally unique identifier (OUI) field, an OUI type field, and an NAN attribute field. For example, the electronic device inserts the scheduling information for the post operation into the NAN attribute field and transmit the NAN attribute field to at least one other electronic device included in the cluster.

According to an embodiment, in the NAN standard, a service discovery frame may be configured to include scheduling information for the post operation using the NAN attribute field as shown in Table 2 as follows.

TABLE 2

| | | NAN Beacons | | |
| --- | --- | --- | --- | --- |
| Attribute ID | Description | Sync | Discovery | NAN SDF |
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute 1 | NO | NO | NO |
| 14-220 | Reserved | NA | NA | NA |
| 221 | Vendor Specific Attribute | YES/O | YES/O | YES/O |
| 222-255 | Reserved | NA | NA | NA |

In operation 905, the electronic device receives response information on the post operation duration information. For example, the electronic device receives the service discovery frame including the response information on the post operation in the DW.

In operation 907, the electronic device activates the post operation duration based on the response information and performs the post operation during the corresponding post operation duration. For example, when the response information includes accept state information on the post operation, the electronic device performs the post operation with at least one target electronic device during the post operation duration based on the response information.

In Table 2, the electronic device inserts scheduling information for the post operation into one of the service description attribute, the reserved, and the vendor specific attribute, which are included in the NAN attribute field, and transmits the NAN attribute field to at least one other electronic device included in the cluster.

According to an embodiment, in the NAN standard, a service discovery frame may be configured to include scheduling information for the post operation using the service subscription attribute as shown in Table 3 as follows.

TABLE 3

| Field | Size (Octets) | Value (Hex) | Description |
| --- | --- | --- | --- |
| Attribute ID | 1 | 0x03 | Identifies the type of NAN attribute |
| Length | 2 | Variable | Length of the following fields in the attribute. |
| Service ID | 6 | Variable | Mandatory field that contains the hash of the Service Name. |
| Instance ID | 1 | Variable | Publish_ID or Subscribe_ID |
| Requestor Instance ID | 1 | Variable | Instance ID from the frame that triggered the transmission if available, otherwise set to 0x00. |
| Service Control | 1 | Variable | Mandatory field that defines the Service Control bitmap as defined in Table 5-9. |
| Binding Bitmap | 0 or 2 | 0x0000 to 0xFFFF | Optional field that indicates the binding of the SDA to post discovery connection attributes |
| Matching Filter Length | 0 or 1 | Variable | An optional field and present if a matching service discovery filter is used |
| Matching Filter | Variable | Variable | An optional field that is a sequence of length and value pairs that identify the matching service discovery filters, refer to FIG. 5-3. |
| Service Response Filter Length | 0 or 1 | Variable | An optional field and present if a service response filter is used. |
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

In Table 3, the electronic device inserts scheduling information for the post operation into service info included in the service description attribute and transmit the service description attribute to at least one other electronic device included in the cluster.

Figure 10:
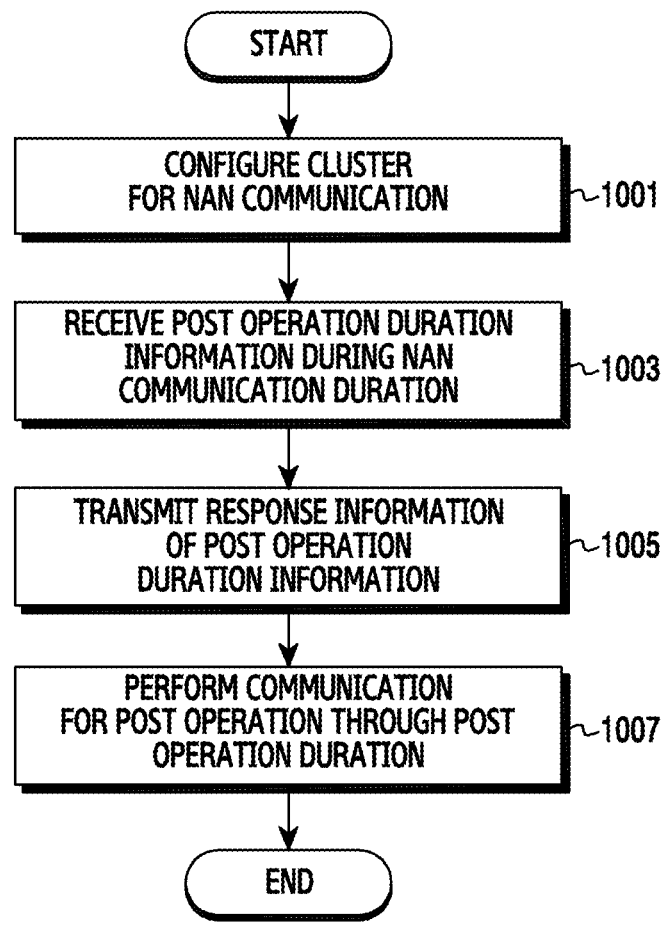
FIG. 10 illustrates a process in which the electronic device identifies post operation duration information on a counterpart electronic device according to embodiments of the present disclosure.

FIG. 10 illustrates a process in which the electronic device identifies post operation duration information on a counterpart electronic device according to embodiments of the present disclosure.

Referring to FIG. 10, in operation 1001, the electronic device configures a cluster for NAN communication. For example, the electronic device may be synchronized with at least one other electronic device included in the cluster for the NAN communication.

In operation 1003, the electronic device receives post operation duration information during a synchronized communication duration in the cluster of the proximity network. For example, the electronic device identifies scheduling information for the post operation with another electronic device in the service discovery frame received from the other electronic device in the cluster during the DW.

In operation 1005, the electronic device transmits response information on the post operation duration information. For example, the electronic device determines whether to accept the post operation with the other electronic device included in the service discovery frame, and broadcasts the service discovery frame including information whether to accept the post operation with the other electronic device to a service area.

In operation 1007, the electronic device activates the post operation duration with the other electronic device and performs the post operation during the corresponding post operation duration. For example, when the electronic device accepts the post operation with the other electronic device, the electronic device performs the post operation with the other electronic device during the post operation duration with the other electronic device.

Figure 11:
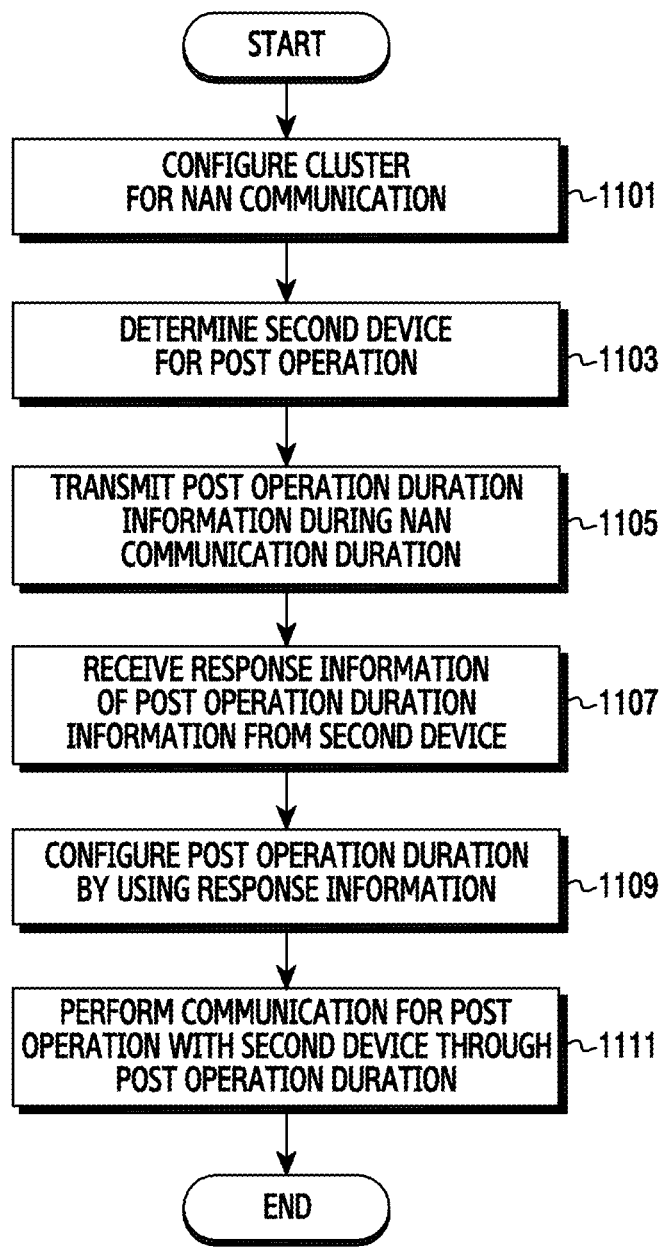
FIG. 11 illustrates a process in which the electronic device determines a post operation duration according to embodiments of the present disclosure.

FIG. 11 illustrates a process in which the electronic device determines a post operation duration according to embodiments of the present disclosure.

Referring to FIG. 11, in operation 1101, the electronic device configures a cluster for NAN communication. For example, the electronic device may be synchronized with at least one other electronic device included in the cluster for the NAN communication.

In operation 1103, the electronic device determines at least one target electronic device for the post operation. For example, the electronic device selects at least one target electronic device from an NAN discovery list based on user input information, selects at least one target electronic device based on a service ID or a device ID acquired by the NAN discovery, and selects at least one target electronic device based on a contact list stored in the electronic device or a device ID.

In operation 1105, the electronic device transmits post operation duration information within a synchronized communication duration in the cluster of the proximity network. For example, the electronic device broadcasts the service discovery frame including scheduling information for the post operation in the DW to a service area, and the scheduling information includes at least one of at least one post operation duration list, the type of post operation, a post operation address, and a target electronic device list.

In operation 1107, the electronic device receives response information on the post operation duration information. For example, the electronic device receives the service discovery frame including the response information on the post operation from at least one second electronic device during the DW.

In operation 1109, the electronic device configures the post operation duration based on the response information.

For example, when a plurality of second electronic devices selects different post operation lists, the electronic device configures the post operation duration to include the post operation lists selected by the plurality of second electronic devices.

In operation 1111, the electronic device activates the post operation duration determined in operation 1109 and performs the post operation during the corresponding post operation duration.

Figure 12:
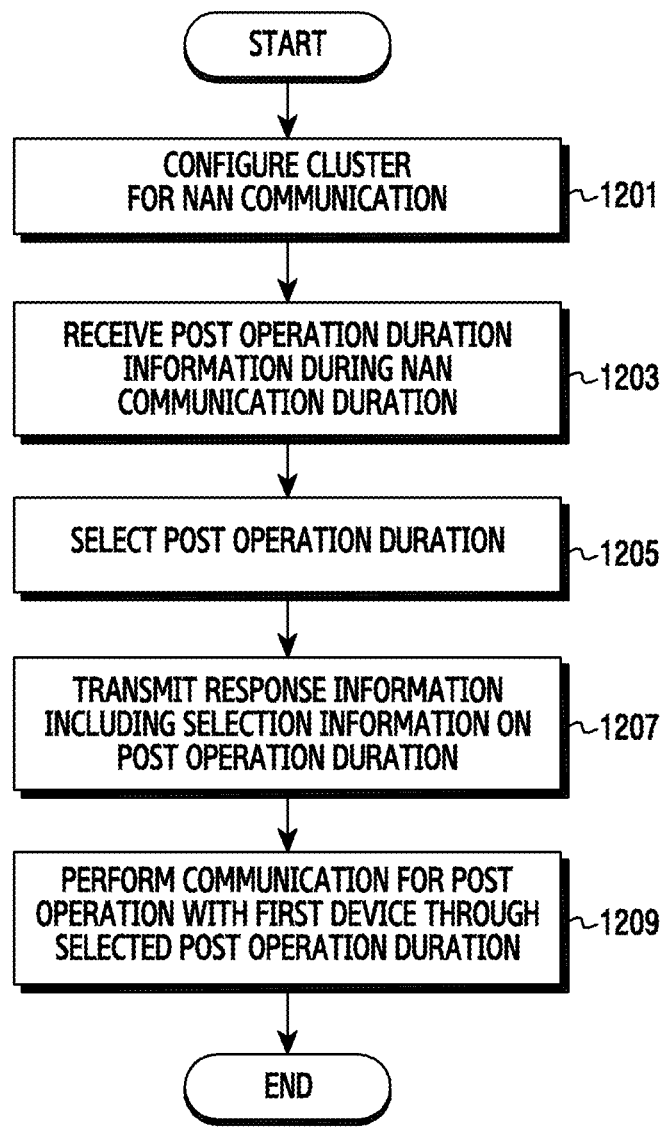
FIG. 12 illustrates a process in which the electronic device selects a post operation duration according to embodiments of the present disclosure.

FIG. 12 illustrates a process for selecting a post operation duration of the electronic device according to embodiments of the present disclosure.

Referring to FIG. 12, in operation 1201, the electronic device configures a cluster for NAN communication. For example, the electronic device may be synchronized with at least one other electronic device included in the cluster for the NAN communication.

In operation 1203, the electronic device receives post operation duration information during a synchronized communication duration in the cluster of the proximity network. For example, the electronic device identifies scheduling information for the post operation with another electronic device in the service discovery frame received from the other electronic device in the cluster during the DW.

In operation 1205, the electronic device selects at least one post operation duration list for the post operation with another electronic device among a plurality of post operation duration lists provided from other electronic devices through the service discovery frame.

In operation 1207, the electronic device transmits response information on the post operation duration information. For example, the electronic device broadcasts the service discovery frame including post operation duration list information selected for the post operation with the other electronic device to a service area.

In operation 1209, the electronic device activates the post operation duration with the other electronic device and performs the post operation during the corresponding post operation duration. For example, the electronic device configures and activates the post operation duration for the post operation with the other electronic device based on the post operation duration list information selected for the post operation with the other electronic device.

Figure 13:
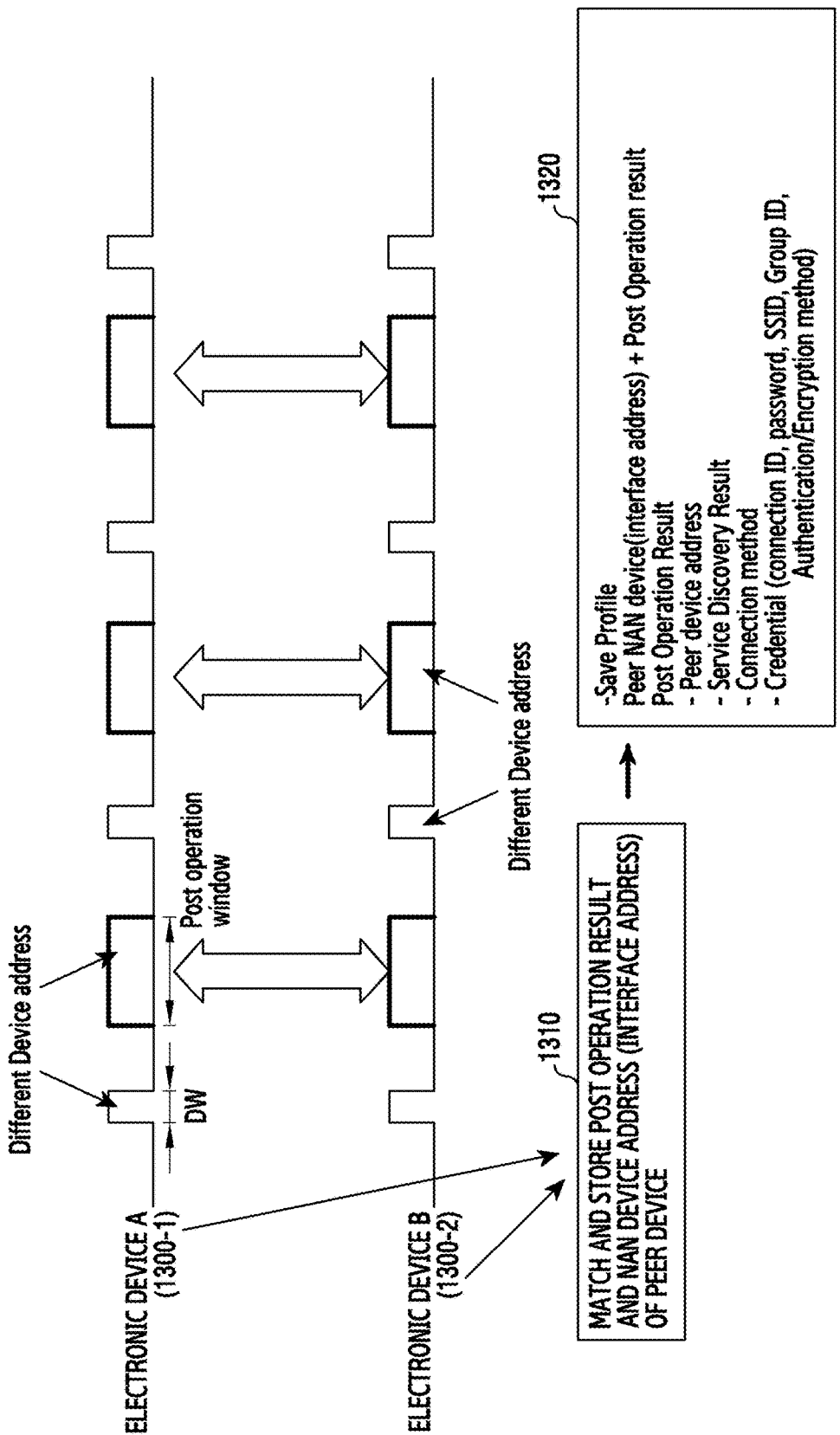
FIG. 13 illustrates mapping between proximity network information and post operation information according to embodiments of the present disclosure.

FIG. 13 illustrates mapping between proximity network information and post operation information according to embodiments of the present disclosure.

Referring to FIG. 13, an electronic device A 1300-1 and an electronic device B 1300-2 may be synchronized in one cluster in the proximity network and perform the post operation during the post operation duration.

According to an embodiment, the electronic device A 1300-1 and the electronic device B 1300-2 may have different addresses used within a synchronized communication duration (for example, DW) in the cluster of the proximity network and post operation duration. For example, the electronic device A 1300-1 and the electronic device B 1300-2 may use a proximity network address such as an NAN interface address in the DW, and use a post operation address such as a MAC address or a global address in the post operation duration.

Accordingly, the electronic device A 1300-1 and the electronic device B 1300-2 determine whether the counterpart electronic device is another electronic device performing further operations through a discovery procedure in the proximity network, and map the proximity network address and the post operation result to increase further operation efficiency and store the mapped information as indicated by reference numeral 1310.

For example, the electronic device A 1300-1 generates and stores a profile 1320 including the proximity network address of the electronic device B 1300-2 and the post operation result with the electronic device B 1300-2. The electronic device B 1300-2 generates and stores the profile 1320 including the proximity network address of the electronic device A 1300-1 and the post operation result with the electronic device A 1300-1. For example, the post operation result includes at least one of a post operation address of the other electronic device performing the post operation, a service discovery result, a connection method, and credential information. The credential information indicates encrypted personal information such as a connection ID, a password, a subsystem identification (SSID), a group ID, and an authentication/encryption method.

According to an embodiment, each electronic device 1300-1 or 1300-2 performs a service discovery procedure for the post operation with the other electronic device, and then maps the proximity network address and the post operation result and store the mapped information.

According to an embodiment, each electronic device 1300-1 and 1300-2 performs a service discovery procedure and a connection procedure for the post operation with the other electronic device, and then maps the proximity network address and the post operation result and stores the mapped information.

According to an embodiment, when a communication connection with the other electronic device for the post operation is released, each electronic device 1300-1 and 1300-2 maps the proximity network address and the post operation result and stores the mapped information.

Figure 14:
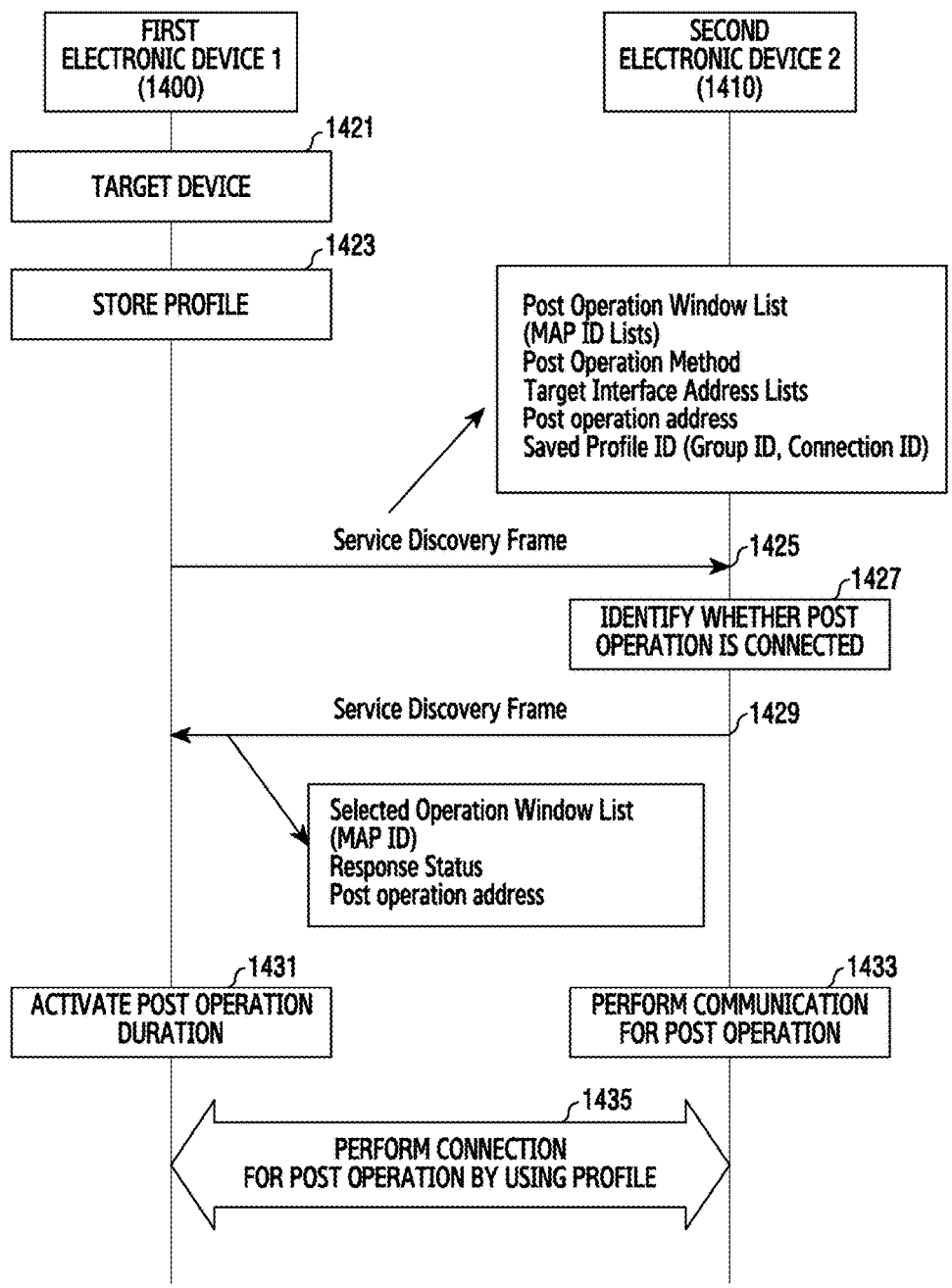
FIG. 14 illustrates signal flows for the post operation using mapping information between the proximity network information and the post operation information according to embodiments of the present disclosure.

FIG. 14 illustrates signal flows to perform the post operation using mapping information between the proximity network information and the post operation information according to embodiments of the present disclosure.

Referring to FIG. 14, a first electronic device 1400 and a second electronic device 1410 may be synchronized in one cluster in the proximity network.

The first electronic device 1400 selects at least one target electronic device such as the second electronic device 1410 for further operations from one or more other electronic devices included in the cluster (1421).

The first electronic device 1400 identifies a profile of the target electronic device which has been mapped to the proximity network address of the target electronic device and stored (1423).

The first electronic device 1400 transmits an SDF including scheduling information for a post operation within a synchronized communication duration in the cluster of the proximity network (1425). For example, the scheduling information includes at least one of at least one post operation duration list, the type of post operation, a post operation address, a target electronic device list, and profile information such as a profile ID on the target electronic device.

The second electronic device 1410 identifies scheduling information and profile information for the post operation in the service discovery frame provided from the first electronic device 1400. The second electronic device 1410 determines whether the post operation is connected to the first electronic device 1400 based on the scheduling information for the post operation included in the service discovery frame (1427).

The second electronic device 1410 transmits the SDF including response information on the post operation within the DW to the first electronic device 1400 (1429).

When the second electronic device 1410 accepts the post operation or when the second electronic device 1410 selects the post operation duration list, the first electronic device 1400 activates the corresponding post operation duration (1431). When the second electronic device 1410 accepts the post operation with the first electronic device 1400, the second electronic device 1410 activates the post operation duration provided from the first electronic device 1400 (1433).

The first electronic device 1400 and the second electronic device 1410 perform communication for the post operation based on the profile information during the post operation duration (1435). For example, the first electronic device 1400 and the second electronic device 1410 omit the service discovery procedure by using the service discovery information stored in the profile, simplify the connection procedure with the other electronic device by using at least one of a connection method and credential information stored in the profile, and when the P2P connection is performed, activate the P2P connection with the other electronic device without separate connection procedure. For example, when a mobile hotspot service is provided, the electronic device configured as a mobile hotspot and the electronic device configured as a client perform a connection with the other electronic device by using connection information stored in the profile.

Figure 15:
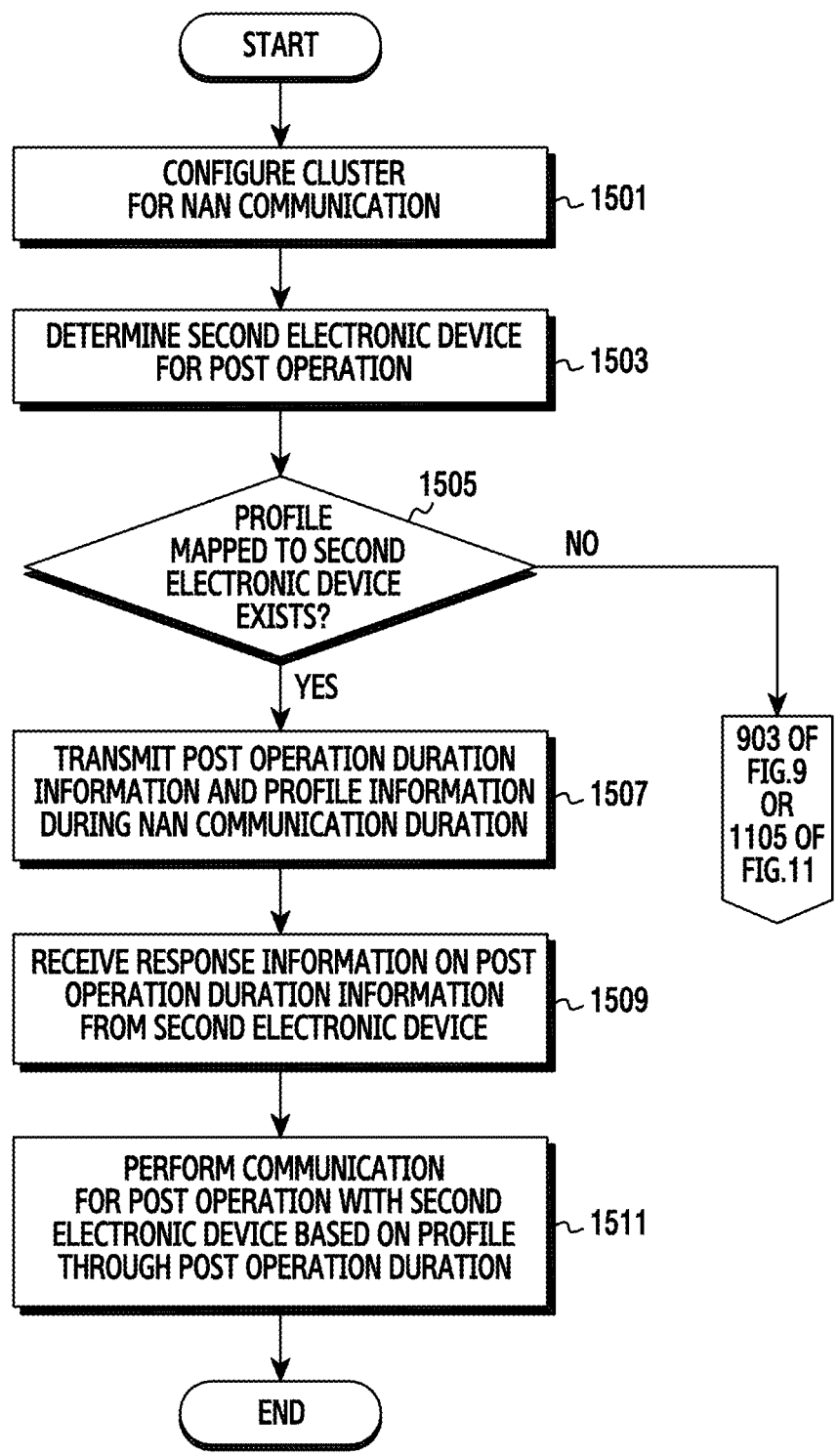
FIG. 15 illustrates a process in which the electronic device performs the post operation by using the post operation information mapped to the proximity network information according to embodiments of the present disclosure.

FIG. 15 illustrates a process in which the electronic device performs the post operation by using the post operation information mapped to the proximity network information according to embodiments of the present disclosure.

Referring to FIG. 15, in operation 1501, the electronic device configures a cluster for NAN communication. For example, the electronic device may be synchronized with at least one other electronic device included in the cluster for the NAN communication.

In operation 1503, the electronic device determines at least one a target electronic device for the post operation.

In operation 1505, the electronic device determines whether a profile of at least one second electronic device exists. For example, the electronic device determines whether a profile mapped to the proximity network address of each second electronic device exists.

When the profile of at least one second electronic device does not exist, the electronic device transmits post operation duration information in the cluster of the proximity network during a synchronized communication duration (for example, DW) in operation 903 of FIG. 9 or operation 1105 of FIG. 11.

In operation 1507, the electronic device transmits profile information and post operation duration information during a synchronized communication duration in the cluster of the proximity network. For example, the electronic device broadcasts the service discovery frame including scheduling information for the post operation within the DW to a service area, wherein the scheduling information includes at least one of at least one post operation duration list, the type of post operation, a post operation address, a target electronic device list, and profile ID on the target electronic device.

In operation 1509, the electronic device receives response information on the post operation duration information. For example, the electronic device receives the service discovery frame including the response information on the post operation from at least one second electronic device during the DW.

In operation 1511, the electronic device activates the post operation duration based on the response information and performs the post operation based on the profile of at least one second electronic device during the corresponding post operation duration. For example, the electronic device omits the service discovery procedure for another electronic device by using service discovery information stored in the profile, and simplifies the connection procedure with the other electronic device by using at least one of a connection method and credential information stored in the profile.

Figure 16:
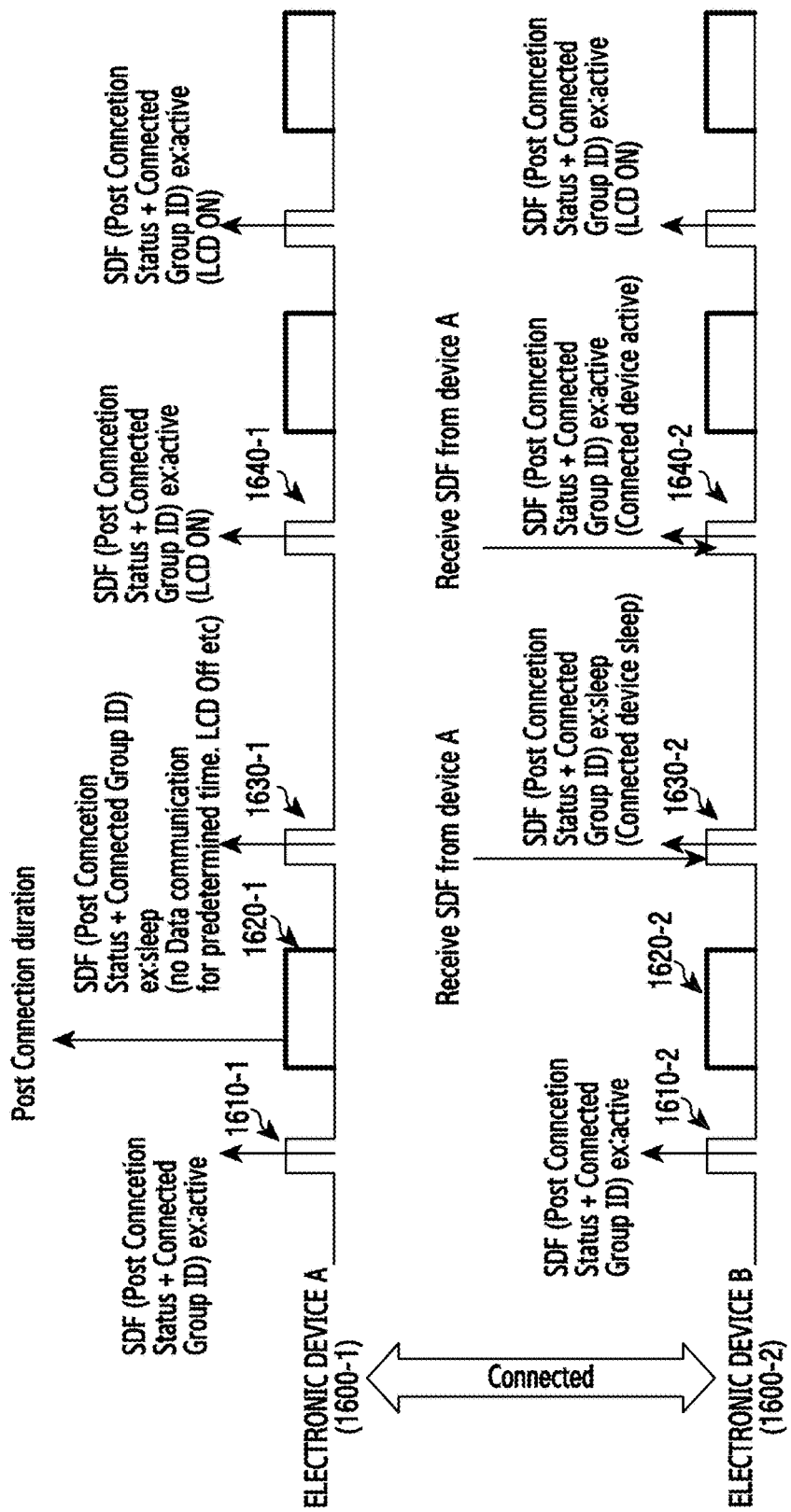
FIG. 16 illustrates transmitting post operation state information by using proximity network information according to embodiments of the present disclosure.

FIG. 16 illustrates transmitting post operation state information by using proximity network information according to embodiments of the present disclosure.

Referring to FIG. 16, an electronic device A 1600-1 and an electronic device B 1600-2 may be synchronized in one cluster for the proximity network and connect communication for the post operation.

Each of the electronic device A 1600-1 and the electronic device B 1600-2 transmits state information on the post operation with the other electronic device within the synchronized communication duration in the cluster of the proximity network as indicated by reference numerals 1610-1 and 1610-2. For example, each of the electronic device A 1600-1 and the electronic device B 1600-2 transmits the service discovery frame including state information and connection information on the post operation within the DW.

According to an embodiment, when the post operation is in an active state, the electronic device A 1600-1 and the electronic device B 1600-2 activate the post operation duration for the post operation based on the active state information on the post operation received within the DW and perform communication for the post operation as indicated by reference numerals 1620-1 and 1620-2.

According to an embodiment, when the post operation of the electronic device A 1600-1 is in a sleep state, the electronic device A 1600-1 transmits sleep state information on the post operation within the DW as indicated by reference numeral 1630-1. The electronic device A 1600-1 deactivates the post operation duration for the post operation based on the sleep state information on the post operation. For example, when there is no data communication for the post operation during a predetermined time, a host processor such as an application processor switches to the sleep state, or a display such as an LCD becomes inactive, the electronic device A 1600-1 recognizes that the post operation is in the sleep state.

The electronic device B 1600-2 deactivates the post operation duration for the post operation with the electronic device A 1600-1 based on sleep state information 1630-2 on the post operation received within the DW. For example, when the post operation of Wi-Fi is performed, the electronic device A 1600-1 and the electronic device B 1600-2 operate in a power saving mode to reduce power consumption. At this time, the electronic device A 1600-1 and the electronic device B 1600-2 identify post operation state information such as a sleep state on the other electronic device for the post operation within the DW, thereby reducing consumption of power generated by temporary switching from the power saving mode to an active mode to maintain the connection.

According to an embodiment, when the post operation of the electronic device A 1600-1 switches to an active state, the electronic device A 1600-1 transmits active state information on the post operation within the DW as indicated by reference numeral 1640-1. The electronic device A 1600-1 activates the post operation duration for the post operation based on the active state information on the post operation. For example, when the electronic device A 1600-1 receives a response signal of the active state information from the electronic device B 1600-2, the electronic device A 1600-1 activates the post operation duration.

The electronic device B 1600-2 activates the post operation duration for the post operation with the electronic device A 1600-1 based on active state information 1640-2 on the post operation received within the DW and perform communication for the post operation with the electronic device A 1600-1.

Figure 17:
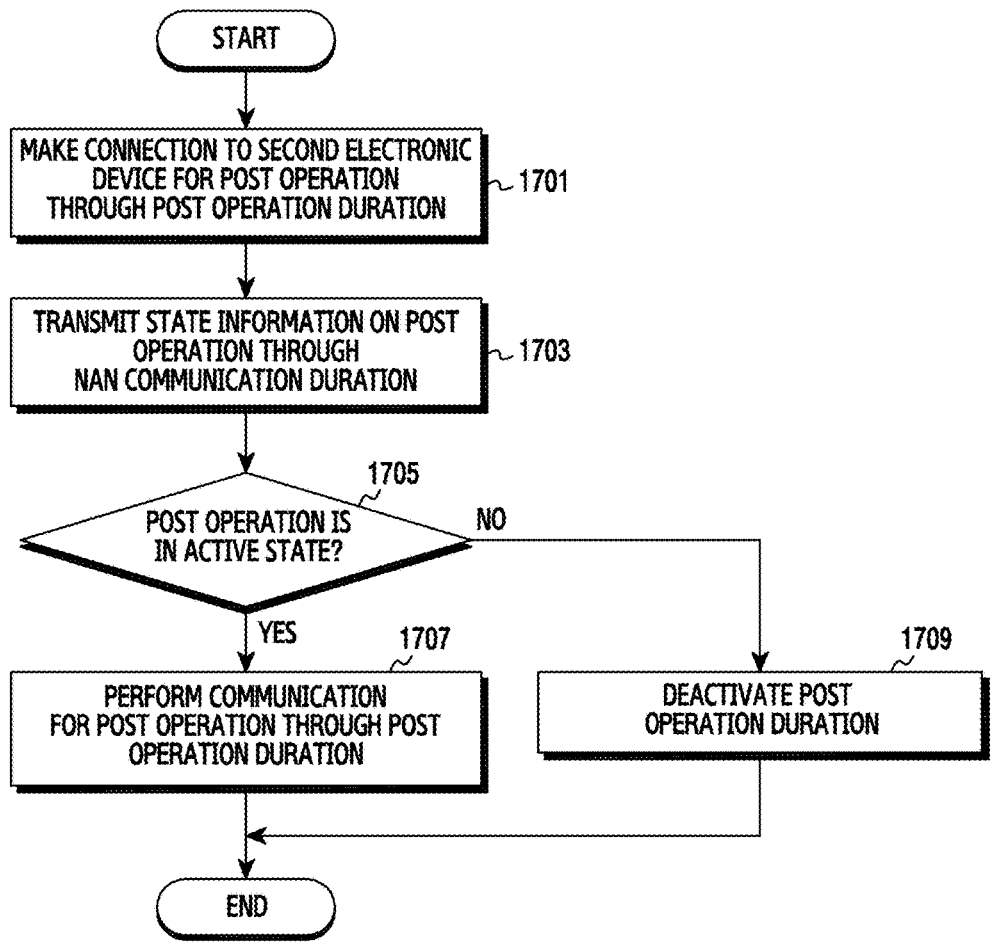
FIG. 17 illustrates a process in which the electronic device transmits post operation state information by using proximity network information according to embodiments of the present disclosure.

FIG. 17 illustrates a process in which the electronic device transmits post operation state information by using proximity network information according to embodiments of the present disclosure.

Referring to FIG. 17, in operation 1701, the electronic device may be synchronized with at least one other electronic device in one cluster for the proximity network and connect communication for the post operation.

In operation 1703, the electronic device transmits state information on the post operation within a synchronized communication duration in the cluster of the proximity network. For example, the electronic device broadcasts the service discovery frame including state information and connection information such as a group ID on the post operation to the service area within the DW.

In operation 1705, the electronic device determines whether the post operation with another electronic device is in an active state.

When the post operation with the other electronic device is in the active state, the electronic device performs communication for the post operation with the other electronic device through the post operation duration in operation 1707.

When the post operation with the other electronic device is not in an active state, i.e., is in a sleep state in operation 1705, the electronic device deactivates the post operation duration with the other electronic device and reduces power consumption due to the post operation in operation 1709.

Figure 18:
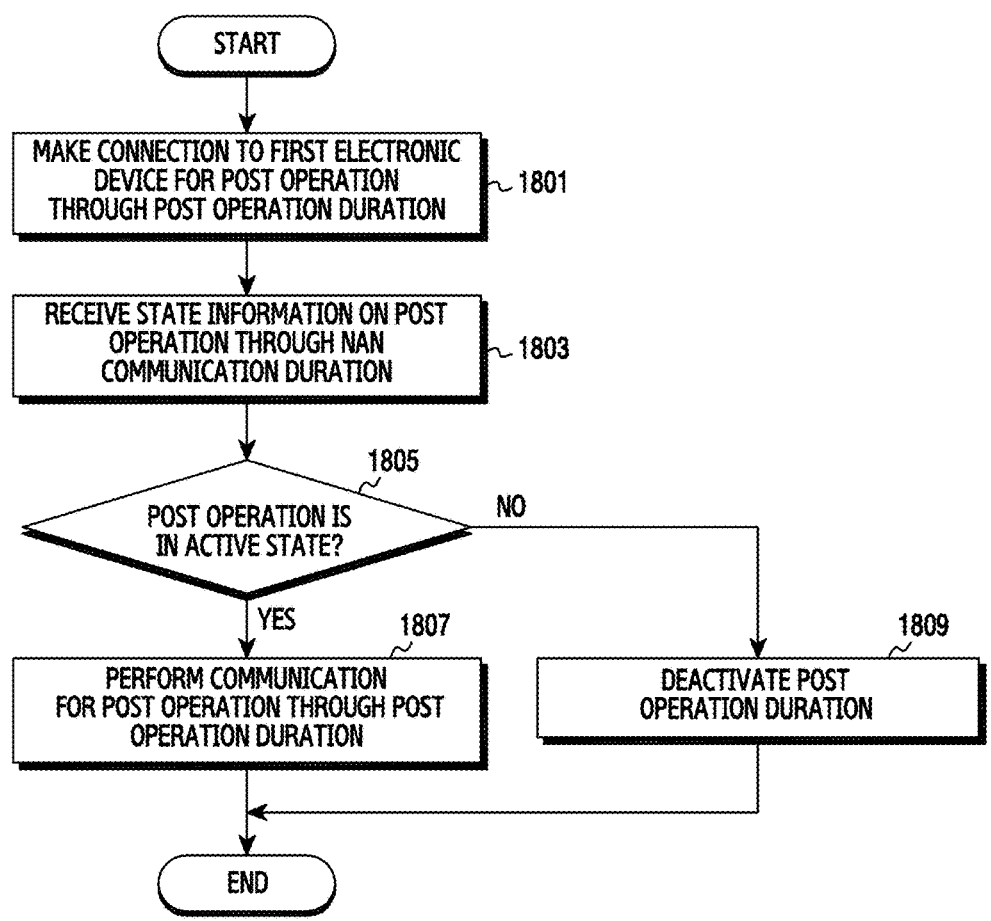
FIG. 18 illustrates a process in which the electronic device receives post operation state information through proximity network information according to embodiments of the present disclosure.

FIG. 18 illustrates a process in which the electronic device receives post operation state information through proximity network information according to embodiments of the present disclosure.

Referring to FIG. 18, in operation 1801, the electronic device may be synchronized with at least one other electronic device in one cluster for the proximity network and connect communication for the post operation.

In operation 1803, the electronic device transmits state information on the post operation within a synchronized communication duration in the cluster of the proximity network. For example, the electronic device receives the service discovery frame including state information and connection information such as a group ID on the post operation within the DW.

In operation 1805, the electronic device determines whether the post operation with another electronic device is in an active state.

When the post operation with the other electronic device is in the active state, the electronic device performs communication for the post operation with the other electronic device through the post operation duration in operation 1807.

When the post operation with the other electronic device is not in an active state in operation 1805, i.e., is in a sleep state, the electronic device deactivates the post operation duration with the other electronic device and reduces power consumption due to the post operation in operation 1809.

According to embodiments of the present disclosure, the synchronized electronic devices within one cluster for the proximity network may have the same service area for the post operation as the service area of the proximity network such as the NAN. Accordingly, the synchronized electronic devices within one cluster for the proximity network control the post operation based on state information on the proximity network as illustrated in FIGS. 19 and 20.

Figure 19:
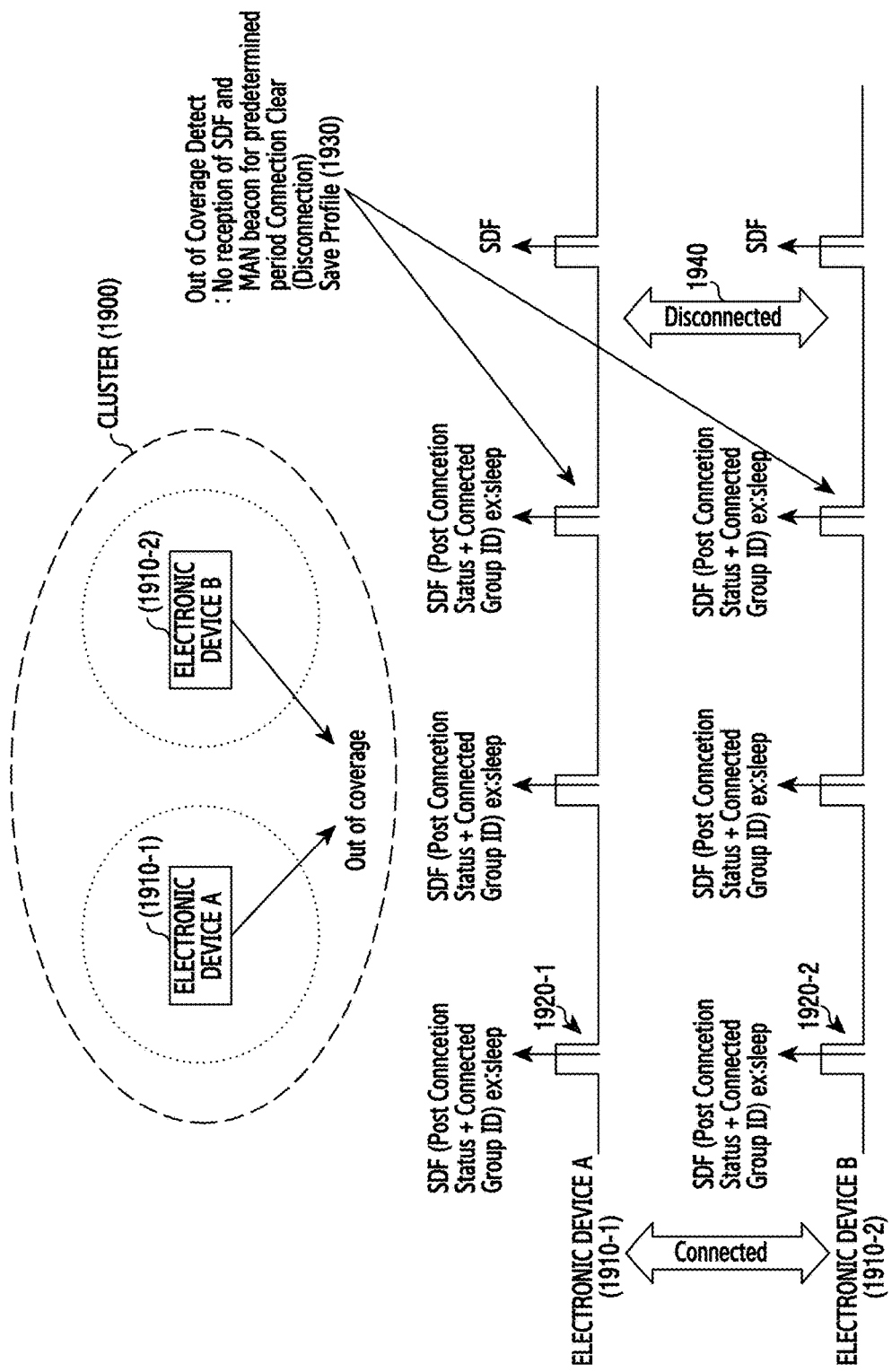
FIG. 19 illustrates releasing a connection of the post operation by using proximity network state information according to embodiments of the present disclosure.
Figure 20:
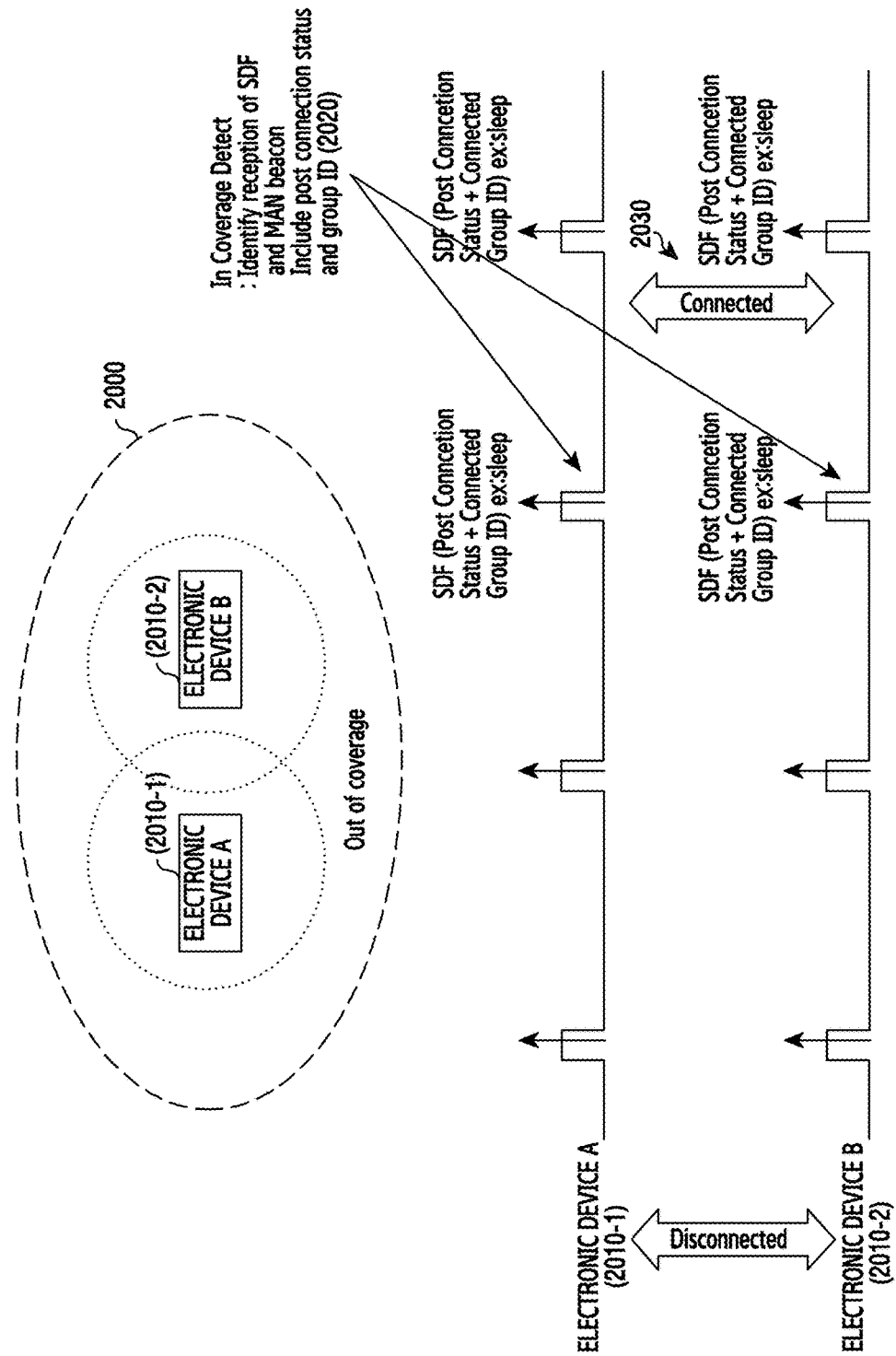
FIG. 20 illustrates connecting the post operation by using proximity network state information according to embodiments of the present disclosure.

FIG. 19 illustrates releasing a connection of the post operation by using state information on the proximity network according to embodiments of the present disclosure.

Referring to FIG. 19, an electronic device A 1910-1 and an electronic device B 1910-2 may be synchronized in one cluster 1900 for the proximity network and connect communication for the post operation.

Each of the electronic device A 1910-1 and the electronic device B 1910-2 transmits the service discovery frame including state information on the post operation within the synchronized communication duration such as DW in a cluster 1900 of the proximity network as indicated by reference numerals 1920-1 and 1920-2. Additionally, the service discovery frame may further include connection information such as a group ID on the electronic device for the post operation.

According to an embodiment, when the post operation is in a sleep state, the electronic device A 1910-1 and the electronic device B 1910-2 maintain the communication connection for the post operation based on the identified state information of the post operation within the DW.

According to an embodiment, when the electronic device A 1910-1 and the electronic device B 1910-2 do not receive the service discovery frame or a beacon message of the counterpart electronic device for a predetermined time as indicated by reference numeral 1930, the electronic device A 1910-1 and the electronic device B 1910-2 recognize that the counterpart electronic device escapes from the service coverage of the proximity network. In this case, the electronic device A 1910-1 and the electronic device B 1910-2 determine that the counterpart electronic device escapes from the service coverage for the post operation and thus release the communication connection with the counterpart electronic device for the post operation as indicated by reference numeral 1940.

FIG. 20 illustrates connecting the post operation by using state information on the proximity network according to embodiments of the present disclosure.

Referring to FIG. 20, when an electronic device A 2010-1 and an electronic device B 2010-2 receive the service discovery frame or a beacon message of the counterpart electronic device when a communication connection with the counterpart electronic device is released as indicated by reference numeral 2020, the electronic device A 2010-1 and the electronic device B 2010-2 determine that the counterpart electronic device is located within the service coverage of the proximity network and may be synchronized in one cluster 2000.

According to an embodiment, when the electronic device A 2010-1 and the electronic device B 2010-2 store a profile mapped to a proximity network address of the counterpart electronic device, the electronic device A 2010-1 and the electronic device B 2010-2 connect communication for the post operation by using the profile mapped to the proximity network address as indicated by reference numeral 2030.

Figure 21:
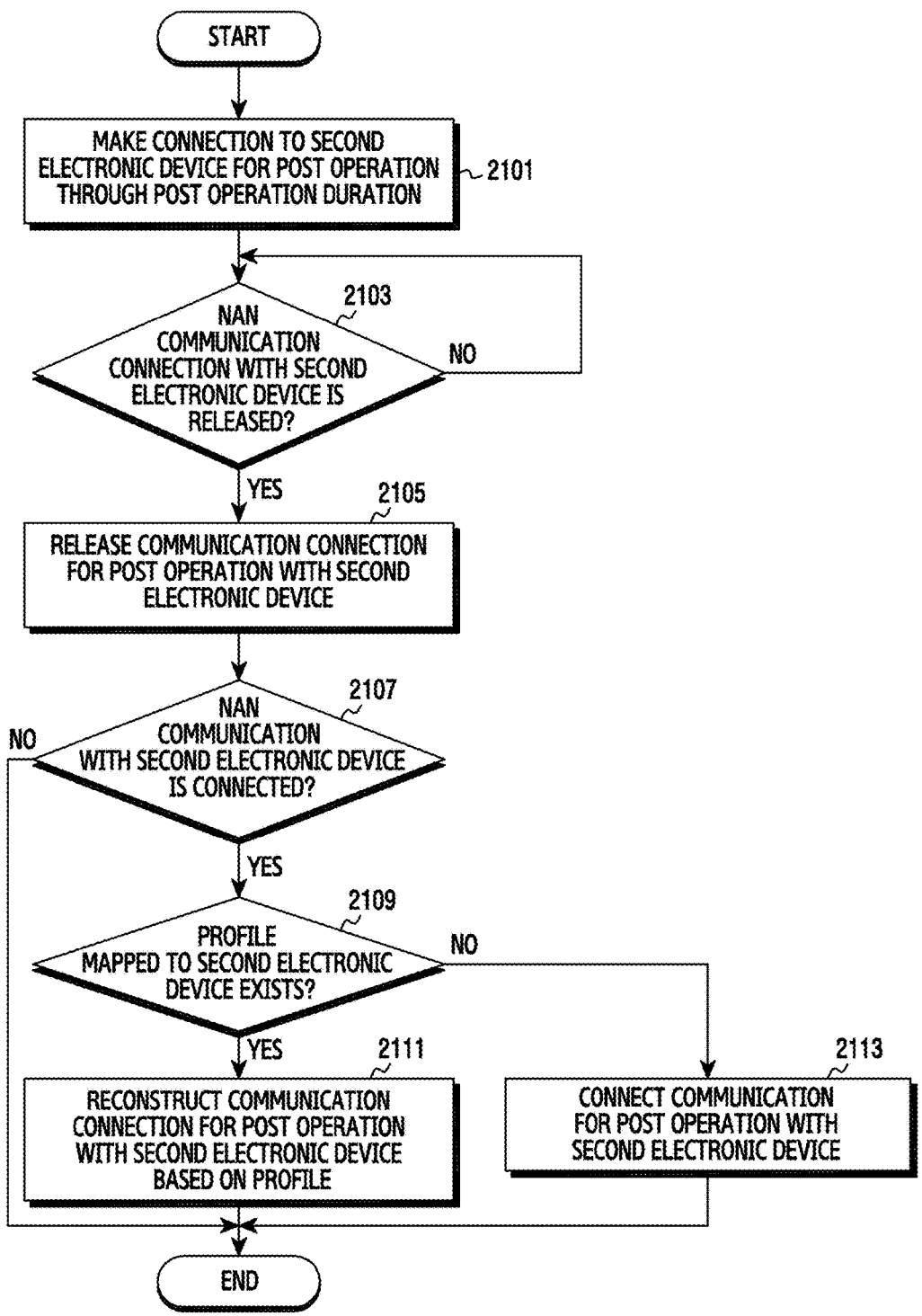
FIG. 21 illustrates a process in which the electronic device controls a connection of the post operation by using proximity network state information according to embodiments of the present disclosure.

FIG. 21 illustrates a process in which the electronic device controls a connection of the post operation by using state information on the proximity network according to embodiments of the present disclosure.

Referring to FIG. 21, in operation 2101, the electronic device may be synchronized with at least one other electronic device in one cluster for the proximity network and make a connection to communication for the post operation.

In operation 2103, the electronic device determines whether a communication connection with a second electronic device for the proximity network is released. For example, the electronic device determines whether a service discovery frame or a beacon message of the second electronic device is received during a predetermined time. When the service discovery frame or the beacon message of the second electronic device is not received during the predetermined time, the electronic device recognizes that the second electronic device escapes from the service coverage of the proximity network and thus the communication connection with the second electronic device is released.

When the communication connection with the second electronic device for the proximity network is not released, the electronic device re-determines whether the communication connection with the second electronic device for the proximity network is released in operation 2103.

When the communication connection with the second electronic device for the proximity network is released, the electronic device determines that the second electronic device escapes from the service coverage for the post operation and release the communication connection for the post operation with the second electronic device in operation 2105.

In operation 2107, the electronic device determines whether communication with the second electronic device for the proximity network is connected. For example, the electronic device determines whether the service discovery frame or the beacon message of the second electronic device is received. When the service discovery frame or the beacon message of the second electronic device is received, the electronic device determines that the second electronic device is located within the service coverage of the proximity network and thus may be synchronized in one cluster.

When the communication with the second electronic device for the proximity network is connected, the electronic device determines whether a profile mapped to a proximity network address of the second electronic device exists in operation 2109.

When the profile mapped to the proximity network address of the second electronic device exists, the electronic device connects communication for the post operation with the second electronic device by using the corresponding profile in operation 2111.

When the profile mapped to the proximity network address of the second electronic device does not exist, the electronic device negotiates the post operation duration with the second electronic device and connects the communication for the post operation with the second electronic device in operation 2113 as illustrated in FIG. 9 or 11.

According to embodiments of the present disclosure, an operation method of an electronic device includes configuring a cluster together with another electronic device through the proximity network, transmitting information for a post operation within a synchronized communication duration of the cluster, receiving a response signal on the information for the post operation, and communicating with at least one other electronic device for the post operation during a post operation duration based on the response information.

The proximity network includes a wireless short-range network to which a NAN standard is applied.

The post operation includes at least one of WLAN, P2P, IBSS, mobile hotspot, Wi-Fi docking, Wi-Fi serial bus, and Wi-Fi direction service.

Transmitting the information for the post operation includes transmitting a service discovery frame including information on the post operation within a synchronized communication duration of the cluster.

The information for the post operation may be included in one of a reserved area, a vendor specific attribute area, and a service descriptor attribute area of an NAN attribute field of the service discovery frame and transmitted, and may be transmitted while including a service information field of the service descriptor attribute area.

The information for the post operation includes at least one of the type of post operation method, an address for the post operation, a channel for the post operation, and an active time of the post operation duration.

The information for the post operation further includes at least one of an electronic device list for performing the post operation, effective time information on the information for the post operation, and identification information on the information for the post operation.

The operation method further includes mapping a proximity network address of the at least one other electronic device and a result of the post operation with the at least one other electronic device and storing the mapped information.

The mapping of the proximity network and the result of the post operation include performing a service discovery procedure with the at least one other electronic device or performing a communication connection procedure with the at least one other electronic device, and then mapping the proximity network address of the at least one other electronic device and the result of the post operation with the at least one other electronic device and storing the mapped information.

The result of the post operation includes at least one of a post operation address of the other electronic device, a service discovery result, a connection method, and personal information on the other electronic device.

The operation method further includes transmitting state information on the post operation within the synchronized communication duration of the cluster.

An electronic device and a method according to embodiments of the present disclosure improves current efficiency by a post operation by synchronizing a post operation duration through negotiation of duration information for the post operation with another electronic device during a synchronized communication duration with the other electronic device in the proximity network.

An electronic device and a method according to embodiments of the present disclosure improve a connection speed for the post operation by mapping and managing proximity network information and post operation information.

An electronic device and a method according to embodiments of the present invention improve current efficiency by the post operation and the connection speed for the post operation by controlling the post operation based on state information on the proximity network.

The term "module" as used herein may, for example, indicate a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure includes at least one of an application-specific integrated circuit (ASIC) chip, a field-programmable gate arrays (FPGA), and a programmable-logic device for performing operations which has been known or are to be developed hereinafter.

According to embodiments, at least some of the devices or the method according to the present disclosure may be implemented by a command stored in a computer-readable storage medium in a programming module form. When an instruction is implemented by one or more processors, one or more processors executes a function corresponding to the instruction. The computer-readable storage medium may be, for example, the memory 130.

The computer readable recoding medium includes a hard disk, a floppy disk, magnetic media such as a magnetic tape), optical media such as a compact disc read only memory (CD-ROM) and a digital versatile disc (DVD), magneto-optical media such as a floptical disk, a hardware device such as a ROM), a Random Access Memory (RAM), or a flash memory. In addition, the program instructions include high class language codes, which can be executed in a computer by using an interpreter, as well as machine codes made by a compiler. Any of the hardware devices as described above may be configured to work as one or more software modules in order to perform the operations according to embodiments of the present disclosure, and vice versa.

Any of the modules or programming modules according to embodiments of the present disclosure includes at least one of the above described elements, exclude some of the elements, or further include other additional elements. The operations performed by the modules, programming module, or other elements according to embodiments of the present disclosure may be executed in a sequential, parallel, repetitive, or heuristic manner. Further, some operations may be executed according to another order or may be omitted, or other operations may be added.

Although the present disclosure has been described above using specific terms in connection with the certain embodiments disclosed in the specification and drawings, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of an electronic device in a neighbor awareness networking (NAN) cluster, the method comprising:
   transmitting, in a first discovery window (DW) among a plurality of DWs, a first service discovery frame (SDF) comprising scheduling information for a post operation to be performed by the electronic device, the scheduling information comprising data for indicating a time interval when the electronic device performs the post operation;
   receiving, in a second DW among the plurality of DWs, a second SDF comprising response information from another electronic device in the NAN cluster; and
   if the response information indicates to allow the post operation with the electronic device in the time interval, performing the post operation with the another electronic device in the time interval,
   wherein the scheduling information further comprises data for indicating a type of the post operation, data for indicating a channel for the post operation, and data regarding an address of the post operation.

2. The method of claim 1, further comprising:
   if the response information indicates not to allow the post operation with the electronic device in the time interval, operating as a low power mode in the time interval.

3. The method of claim 1, wherein the time interval is configured outside of the plurality of DWs.

4. The method of claim 1, wherein the post operation comprises at least one of an operation for a wireless local area network (WLAN), a peer to peer (P2P), a mobile hotspot, a Wi-Fi docking, a Wi-Fi serial bus, or a Wi-Fi direct service (WFDS).

5. The method of claim 1, wherein the scheduling information is included in a NAN attribute field.

6. The method of claim 5, wherein the scheduling information is included in a service description attribute in the NAN attribute field.

7. The method of claim 5, wherein the scheduling information is included in a reserved area in the NAN attribute field.

8. The method of claim 5, wherein the scheduling information is included in a vendor specific attribute in the NAN attribute field.

9. The method of claim 1, wherein the data is configured as a bitmap which comprises a plurality of bits for respectively indicating a plurality of time units (TUs),
   wherein at least one bit corresponding to the time interval among the plurality of bits is set to a first value, and
   wherein at least one another bit other than the at least one bit among the plurality of bits is set to a second value different from the first value.

10. The method of claim 1, further comprising:
    storing profile information that corresponds to the another electronic device based on a result of the post operation.

11. The method of claim 1, wherein the result of the post operation comprises credential information comprising one or more of a connection identifier (ID), a password, a subsystem identification (SSID), a group ID, or an authentication/encryption method as encrypted personal information.

12. An electronic device comprising:
    a communication interface; and
    a processor, electrically coupled with the communication interface, configured to:
    control to transmit, in a first discovery window (DW) among a plurality of DWs, a first service discovery frame (SDF) comprising scheduling information for a post operation to be performed by the electronic device, the scheduling information comprising data for indicating a time interval when the electronic device performs the post operation;
    control to receive, in a second DW among the plurality of DWs, a second SDF comprising response information from another electronic device in the NAN cluster; and
    if the response information indicates to allow the post operation with the electronic device in the time interval, control to perform the post operation with the another electronic device in the time interval,
    wherein the scheduling information further comprises data for indicating a type of the post operation, data for indicating a channel for the post operation, and data regarding an address of the post operation.

13. The electronic device of claim 12, wherein the processor is further configured to:

if the response information indicates not to allow the post operation with the electronic device in the time interval, control to operate as a low power mode in the time interval.

14. The electronic device of claim 12, wherein the time interval is configured outside of the plurality of DWs.

15. The electronic device of claim 12, wherein the post operation comprises at least one of an operation for a wireless local area network (WLAN), a peer to peer (P2P), a mobile hotspot, a Wi-Fi docking, a Wi-Fi serial bus, or a Wi-Fi direct service (WFDS).

16. The electronic device of claim 12, wherein the scheduling information is included in a NAN attribute field.

17. The electronic device of claim 16, wherein the scheduling information is included in a service description attribute in the NAN attribute field.

18. The electronic device of claim 16, wherein the scheduling information is included in a reserved area in the NAN attribute field.

19. The electronic device of claim 16, wherein the scheduling information is included in a vendor specific attribute in the NAN attribute field.

20. The electronic device of claim 12, wherein the data is configured as a bitmap which comprises a plurality of bits for respectively indicating a plurality of time units (TUs),
wherein at least one bit corresponding to the time interval among the plurality of bits is set to a first value, and
wherein at least one another bit other than the at least one bit among the plurality of bits is set to a second value different from the first value.

21. The electronic device of claim 12, wherein the processor is further configured to:
control to store profile information that corresponds to the another electronic device based on a result of the post operation.

22. The electronic device of claim 21, wherein the result of the post operation comprises credential information comprising one or more of a connection identifier (ID), a password, a subsystem identification (SSID), a group ID, or an authentication/encryption method as encrypted personal information.

* * * * *